(12) United States Patent
Shahroudi et al.

(10) Patent No.: US 10,935,054 B2
(45) Date of Patent: *Mar. 2, 2021

(54) BUTTERFLY ROTARY PISTON TYPE ACTUATOR

(71) Applicant: Woodward, Inc., Fort Collins, CO (US)

(72) Inventors: Kamran Eftekhari Shahroudi, Fort Collins, CO (US); Barry T. Brinks, Fort Collins, CO (US); Brian Hoemke, Belvidere, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,089

(22) Filed: Sep. 18, 2019

(65) Prior Publication Data

US 2020/0011354 A1    Jan. 9, 2020

Related U.S. Application Data

(63) Continuation of application No. 15/850,802, filed on Dec. 21, 2017, now Pat. No. 10,563,677.

(Continued)

(51) Int. Cl.
*F15B 15/12* (2006.01)
*F16H 19/00* (2006.01)

(52) U.S. Cl.
CPC ......... *F15B 15/125* (2013.01); *F16H 19/001* (2013.01)

(58) Field of Classification Search
CPC ................. F15B 15/125; F03C 4/00

(Continued)

(56) References Cited

U.S. PATENT DOCUMENTS

| 1,032,694 A | 7/1912 | Milne |
| 1,704,716 A | 3/1929 | Bailey |

(Continued)

FOREIGN PATENT DOCUMENTS

| CH | 122141 | 9/1927 |
| DE | 1176491 | 8/1964 |

(Continued)

OTHER PUBLICATIONS

"Becker Rotary Piston Spring Return RPSR Actuators," GE Oil & Gas, Sep. 2014, 16 pages. http://exionasia.com/wp-content/uploads/2015/01/GEA19652_Becker-RPSR-Actuator-Brochure.pdf.

(Continued)

*Primary Examiner* — F Daniel Lopez
*Assistant Examiner* — Daniel S Collins
(74) *Attorney, Agent, or Firm* — Fish & Richardson P.C.

(57) ABSTRACT

The subject matter of this specification can be embodied in, among other things, an articulated joint includes a first rotary actuator having a first housing defining a first arcuate chamber comprising a first cavity, and an arcuate-shaped first piston having a first radius of curvature and disposed in said first housing for reciprocal movement in the first arcuate chamber, a second rotary actuator having a second housing defining a second arcuate chamber comprising a second cavity, and an arcuate-shaped second piston having a second radius of curvature and disposed in said second housing for reciprocal movement in the second arcuate chamber, wherein a first radial side of the first piston relative to the first radius of curvature is in bearing contact with a first radial side of the second piston relative to the second radius of curvature at a contact point between the first axis and the second axis.

27 Claims, 21 Drawing Sheets

Related U.S. Application Data

(60) Provisional application No. 62/437,473, filed on Dec. 21, 2016.

(58) Field of Classification Search
USPC .................................................. 92/120, 67
See application file for complete search history.

(56) References Cited

U.S. PATENT DOCUMENTS

| | | | |
|---|---|---|---|
| 2,630,786 A | 3/1953 | Poore | |
| 2,801,068 A | 7/1957 | Paul | |
| 2,896,413 A | 7/1959 | Hussey | |
| 2,974,645 A | 3/1961 | Sune | |
| 3,279,755 A | 10/1966 | Notenboom | |
| 3,351,121 A | 11/1967 | Rumsey | |
| 3,367,424 A | 2/1968 | Shunichi et al. | |
| 3,444,788 A | 5/1969 | Sneen | |
| 3,446,120 A | 5/1969 | Sneen | |
| 3,731,546 A | 5/1973 | Macdonald | |
| 3,731,597 A | 5/1973 | Payne | |
| 3,877,349 A | 4/1975 | Schindel | |
| 4,033,519 A | 7/1977 | Abe et al. | |
| 4,242,947 A | 1/1981 | Renner et al. | |
| 4,459,898 A | 7/1984 | Harjar et al. | |
| 4,590,816 A | 5/1986 | Weyer | |
| 4,755,104 A | 7/1988 | Castro et al. | |
| 4,850,329 A | 7/1989 | Taylor et al. | |
| 4,945,778 A | 8/1990 | Weyer | |
| 5,109,754 A | 5/1992 | Shaw | |
| 5,113,107 A | 5/1992 | Atsumi et al. | |
| 5,235,900 A | 8/1993 | Garceau | |
| 5,495,791 A | 3/1996 | Sande et al. | |
| 5,549,448 A | 8/1996 | Langston | |
| 5,996,523 A | 12/1999 | Fox | |
| 6,276,660 B1 | 8/2001 | Wittkopp | |
| 6,361,033 B1 | 3/2002 | Jones et al. | |
| 6,769,868 B2 | 8/2004 | Harrold | |
| 6,843,605 B2 | 1/2005 | Tamada et al. | |
| 7,685,929 B2 | 3/2010 | Mainville | |
| 7,895,935 B2 | 3/2011 | Kells | |
| 8,435,000 B2 | 5/2013 | Wong et al. | |
| 8,801,290 B2 | 8/2014 | Heshmat | |
| 9,133,923 B2 | 9/2015 | Ito et al. | |
| 10,563,677 B2 * | 2/2020 | Shahroudi | F15B 15/125 |
| 2009/0058581 A1 | 3/2009 | Neff et al. | |
| 2012/0043832 A1 | 2/2012 | Neff et al. | |
| 2014/0087915 A1 | 3/2014 | Rohs et al. | |
| 2014/0238227 A1 | 8/2014 | Kim et al. | |
| 2014/0238228 A1 | 8/2014 | Sobolewski et al. | |
| 2015/0322790 A1 | 11/2015 | Yao et al. | |
| 2016/0177722 A1 | 6/2016 | Ito et al. | |
| 2018/0172033 A1 | 6/2018 | Shahroudi et al. | |

FOREIGN PATENT DOCUMENTS

| | | |
|---|---|---|
| DE | 2600459 | 7/1977 |
| DE | 3016427 | 4/1983 |
| DE | 3245677 | 6/1984 |
| DE | 10322501 | 12/2004 |
| EP | 0229833 | 7/1987 |
| EP | 1101902 | 5/2001 |
| EP | 2586966 | 5/2013 |
| EP | 2644823 | 10/2013 |
| EP | 3037677 | 6/2016 |
| GB | 1199847 | 7/1970 |
| GB | 1261801 | 1/1972 |
| JP | S5530523 | 3/1980 |
| JP | S58604 | 1/1983 |
| JP | S59122402 | 8/1984 |
| JP | H11193772 | 7/1999 |
| WO | WO199325818 | 12/1993 |
| WO | WO03008781 | 1/2003 |
| WO | WO2007003000 | 1/2007 |
| WO | WO2014133884 | 9/2014 |
| WO | WO2014133939 | 9/2014 |
| WO | WO2017171564 | 10/2017 |

OTHER PUBLICATIONS

International Preninmy Report on Patentability in International Application No. PCT/US2017/055153 dated Apr. 19, 2019, 7 pages.
International Search Report and Written Opinion of the International Searching Authority issued in International Application No. PCT/US2017/045628 dated May 7, 2018, 24 pages.
International Search Report and Written Opinion of the International Searching Authority issued in International Application No. PCT/US2017/045631 dated May 7, 2018, 20 pages.
Invitation to Pay Additional Fees and partial International Search Report issued in International Application No. PCT/US2017/045628 dated Nov. 7, 2017; 15 pages.
Invitation to Pay Additional Fees and partial International Search Report issued in International Application No. PCT/US2017/045631 dated Nov. 7, 2017; 12 pages.
O'Neill, "Scotch Yoke Piston Actuators," Automated & Manual Valves and Flow Meters, Assured Automation, Nov. 27, 2012, 4 pages.
PCT International Search Report and Written Opinion of the International Searching Authority, PCT/US2017/055153, dated Jan. 19, 2018, 10 pages.
Sparow, "Hydraulic Oscillating Actuator," May 7, 2010, 2 pages. http://www.hydraulicstatic.com/20100507_hydraulic-oscillating-actuator.html.
U.S. Appl. No. 15/286,262, filed Oct. 5, 2016, Kim.
U.S. Appl. No. 15/669,314, filed Aug. 4, 2017, Shahroudi.

* cited by examiner

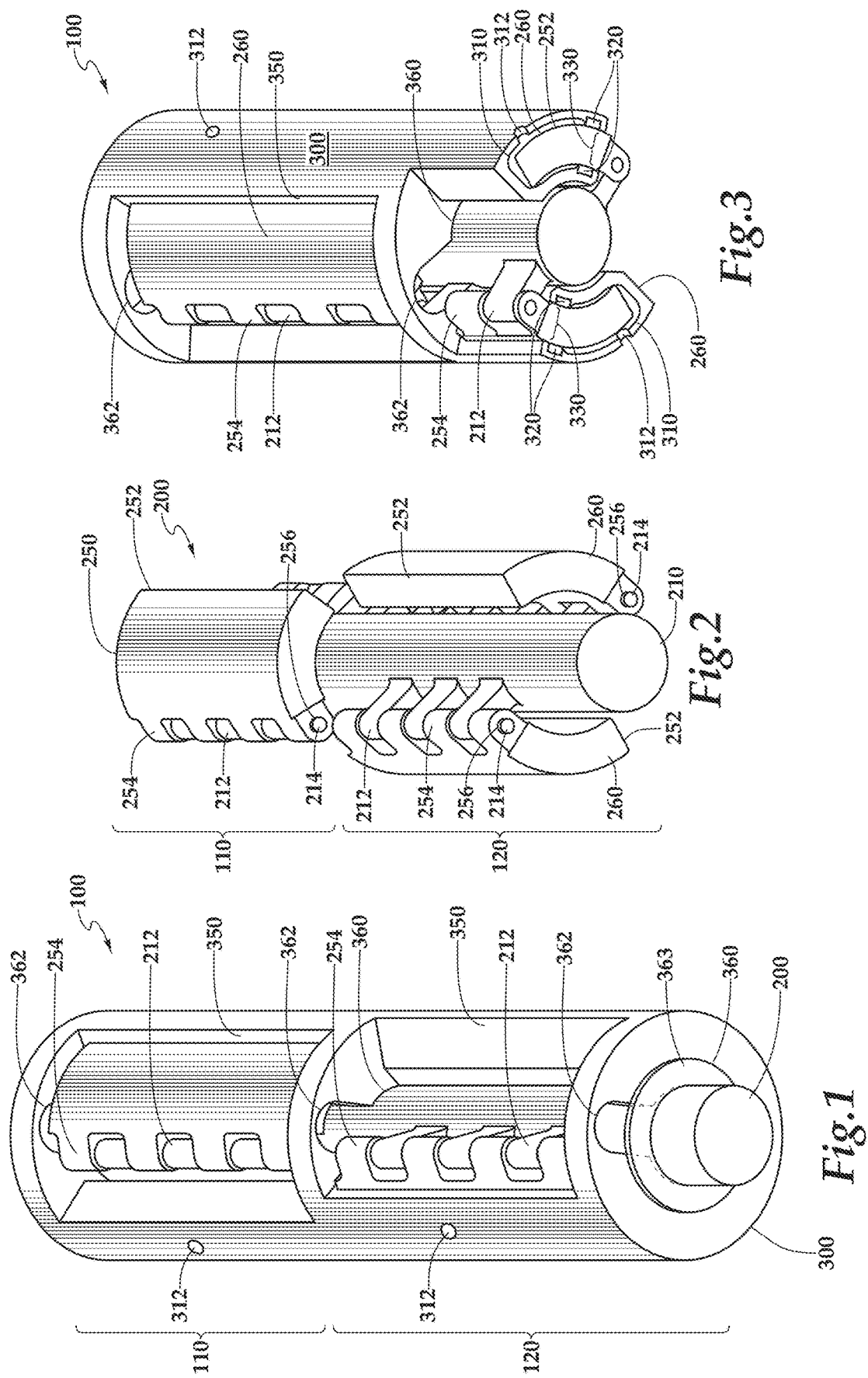

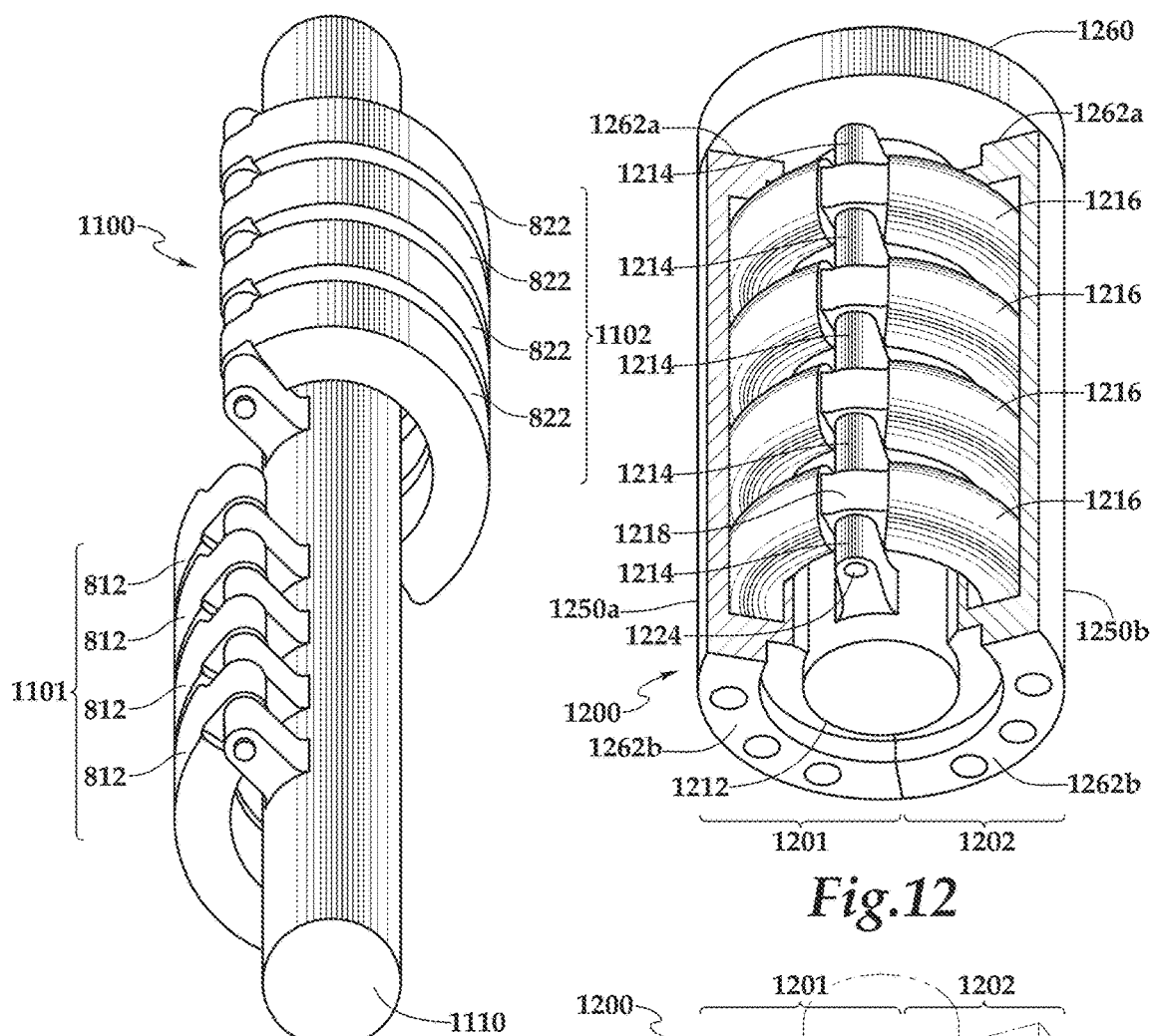
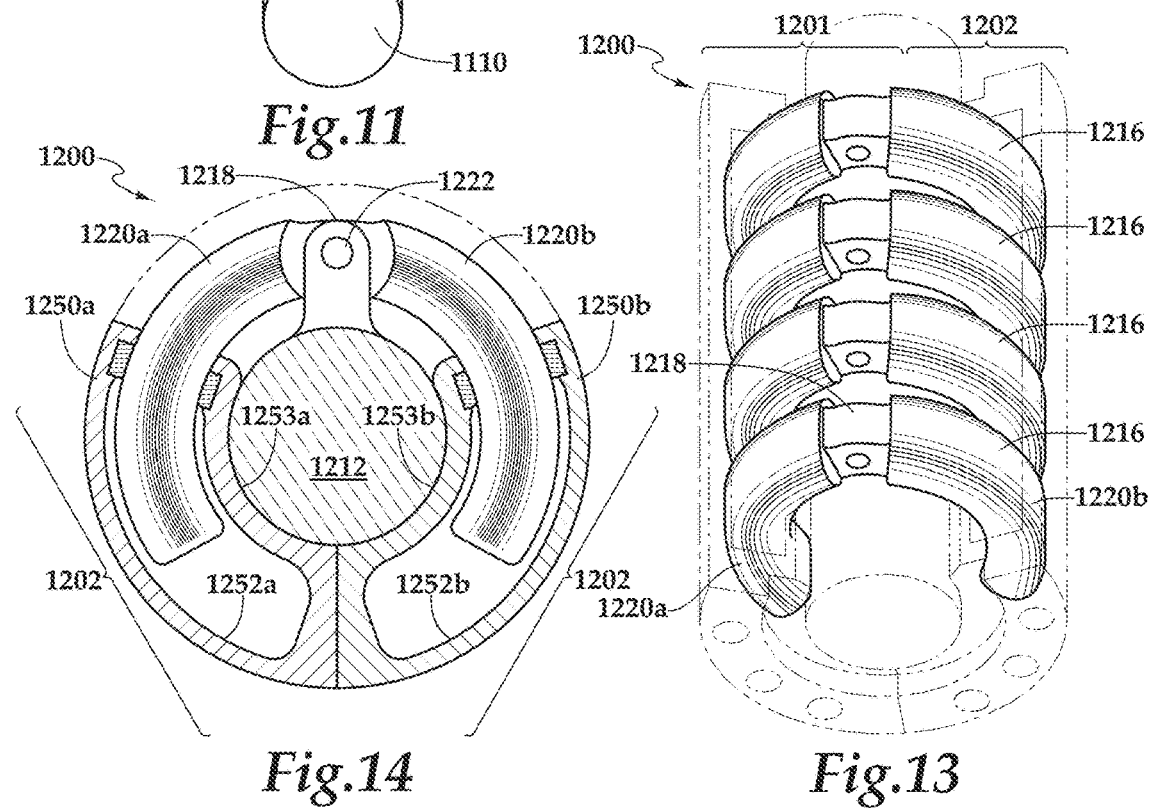
Fig.11  Fig.12  Fig.14  Fig.13

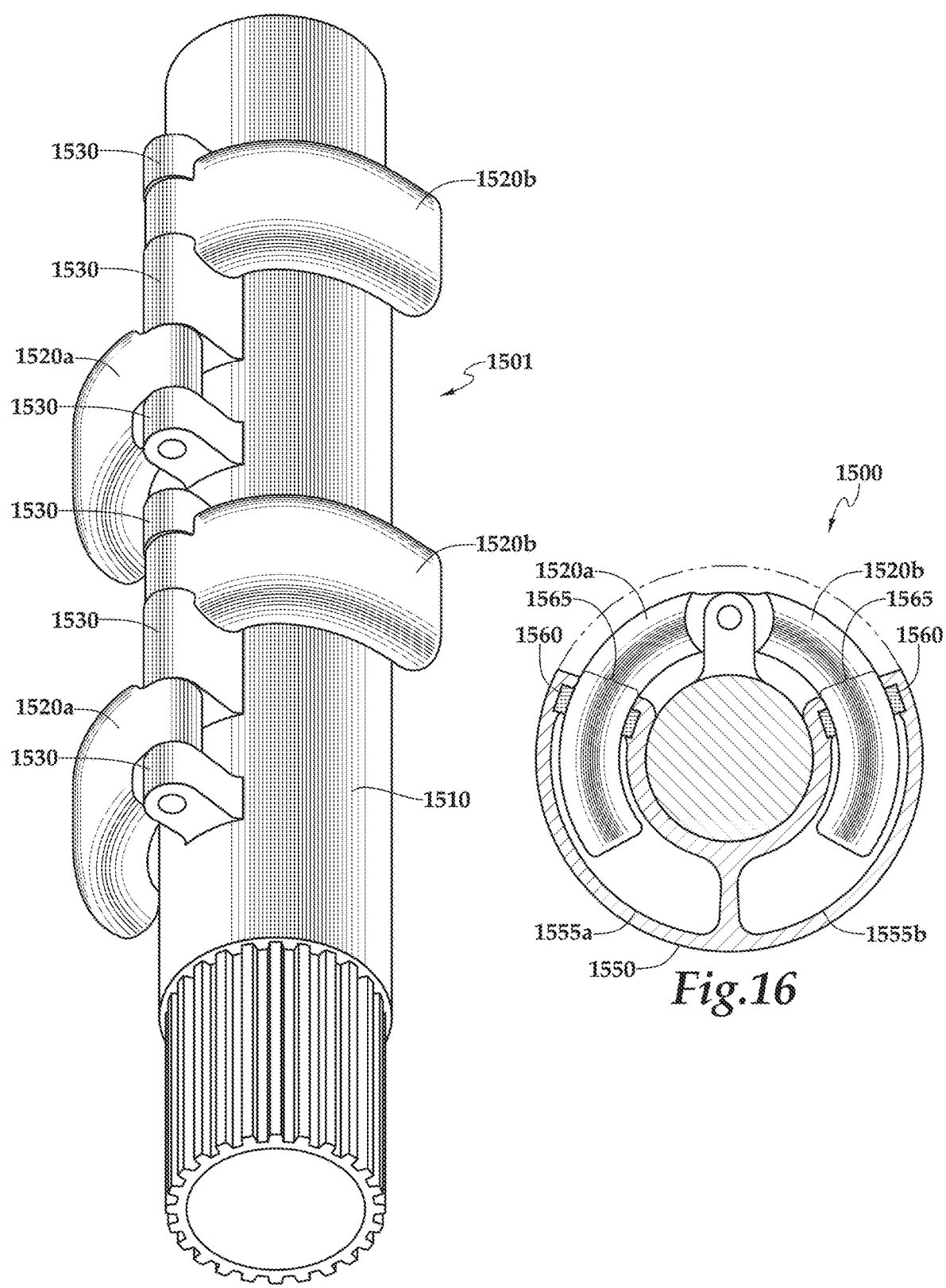

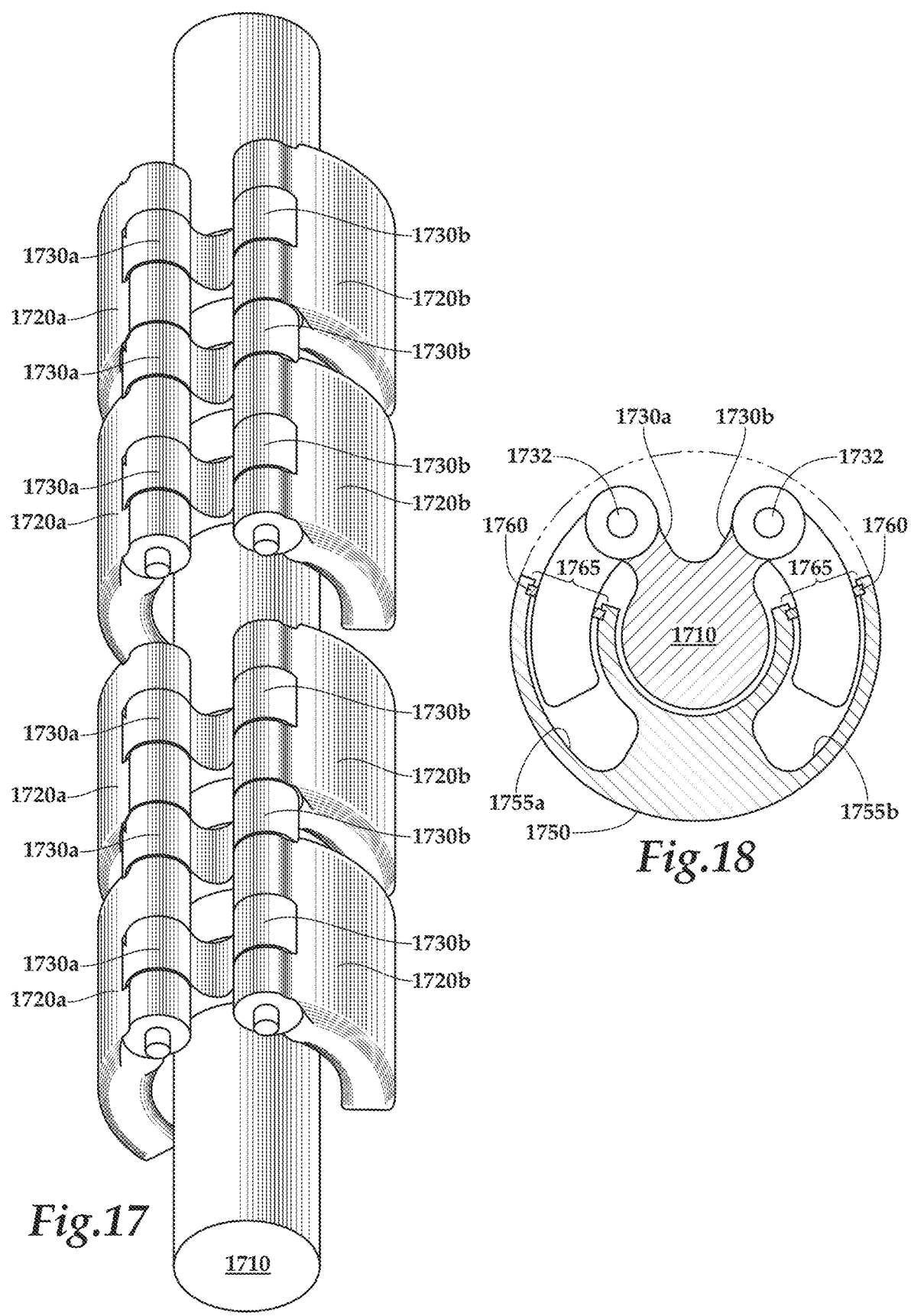

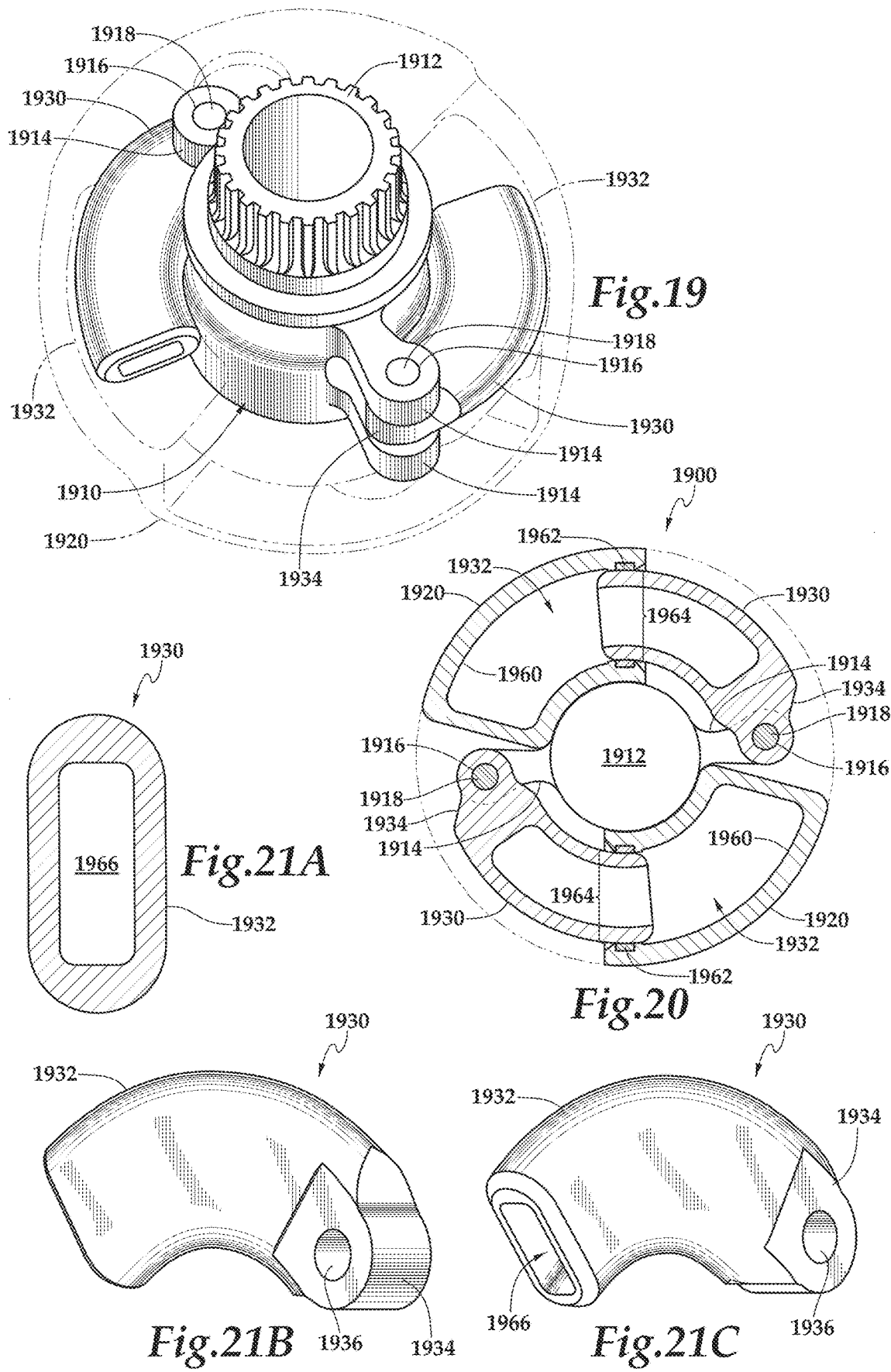

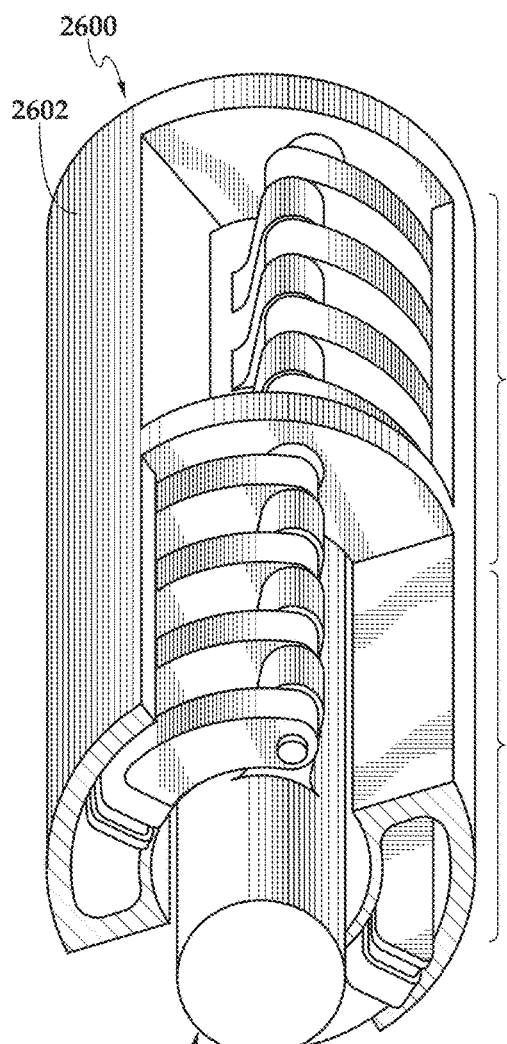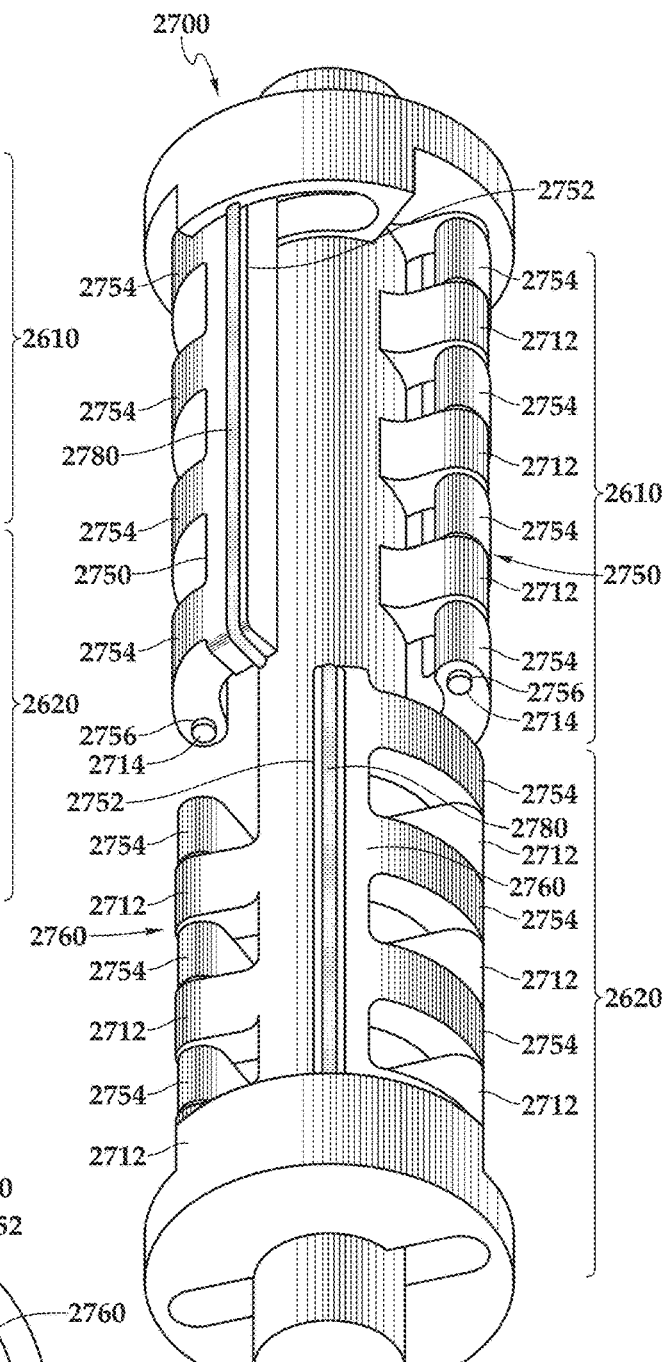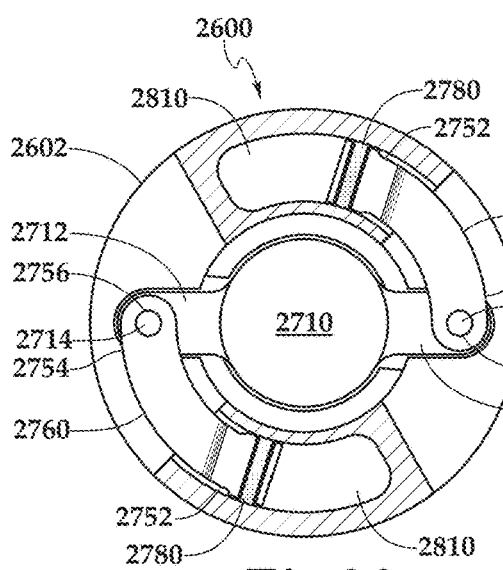

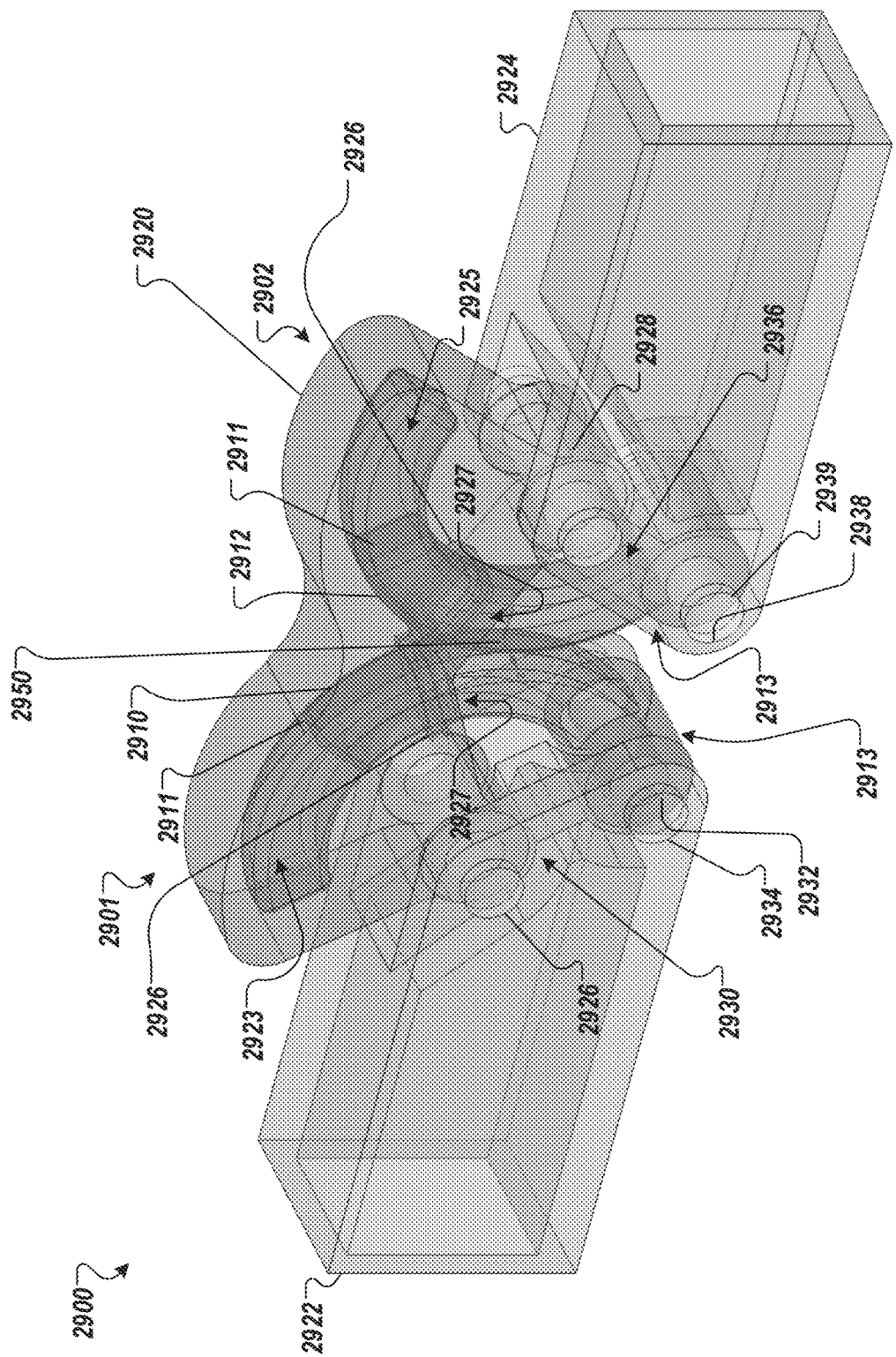

1

BUTTERFLY ROTARY PISTON TYPE ACTUATOR

CROSS-REFERENCE TO RELATED APPLICATIONS

This application is a continuation of and claims the benefit of priority to U.S. patent application Ser. No. 15/850,802, filed Dec. 21, 2017, which claims priority to U.S. Provisional Application No. 62/437,473, filed Dec. 21, 2016, the contents of which are incorporated by reference herein.

TECHNICAL FIELD

This invention relates to an actuator device and more particularly to a rotary piston type actuator device wherein the pistons of the rotor are moved by fluid under pressure.

BACKGROUND

Rotary hydraulic actuators of various forms are currently used in industrial mechanical power conversion applications. This industrial usage is commonly for applications where continuous inertial loading is desired without the need for load holding for long durations, e.g. hours, without the use of an external fluid power supply. Aircraft flight control applications generally implement loaded positional holding, for example, in a failure mitigation mode, using substantially only the blocked fluid column to hold position.

In certain applications, such as primary flight controls used for aircraft operation, positional accuracy in load holding by rotary actuators is desired. Positional accuracy can be improved by minimizing internal leakage characteristics inherent to the design of rotary actuators. However, it can be difficult to provide leak-free performance in typical rotary hydraulic actuators, e.g., rotary "vane" or rotary "piston" type configurations.

SUMMARY

In general, this document relates to rotary piston-type actuators.

In a first aspect, an articulated joint includes a first rotary actuator having a first housing defining a first arcuate chamber comprising a first cavity and a first open end, and an arcuate-shaped first piston having a first radius of curvature and disposed in said first housing for reciprocal movement in the first arcuate chamber through the first open end and in a first plane about a first axis, a second rotary actuator having a second housing defining a second arcuate chamber comprising a second cavity and a second open end, and an arcuate-shaped second piston having a second radius of curvature and disposed in said second housing for reciprocal movement in the second arcuate chamber through the second open end and in a second plane substantially parallel to the first plane about a second axis, wherein a first radial side of the first piston relative to the first radius of curvature is in bearing contact with a first radial side of the second piston relative to the second radius of curvature at a contact point between the first axis and the second axis.

Various embodiments can include some, all, or none of the following features. The first radial side of the first piston can be in direct contact with the first radial side of the second piston. The articulated joint can include a bearing member in bearing contact with the first radial side of the first piston and the first radial side of the second piston, wherein the first radial side of the first piston is in indirect contact with the first radial side of the second piston through the bearing member. The first radial side of the first piston can be a radially outer side of the first piston, and the first radial side of the second piston can be a radially outer side of the second piston. The first housing can be affixed to the second housing. The second piston can be oriented in the same rotational direction as the first piston. The second piston can be oriented in the opposite rotational direction as the first piston. The first piston can be configured to rotate about the first axis in a first rotational direction while entering the first cavity and rotate about the first axis in a second rotational direction opposite the first rotational direction while exiting the first cavity, the second piston can be configured to rotate about the second axis in the second rotational direction while entering the second cavity and rotate about the second axis in the first rotational direction while exiting the second cavity. The first rotary actuator can include a first rotor assembly rotatably journaled in said first housing and comprising an axis shaft and a rotor arm extending radially outward from the axis shaft, wherein a first portion of the first piston contacts the rotor arm. The articulated joint can include a rotary output shaft extending from the axis shaft and configured to be rotated by the axis shaft. The first rotor arm can include an arm portion extending from the axis shaft radially beyond the first portion. The axis shaft can be fixedly positioned relative to a second axis shaft by the first housing and the second housing. The first rotary actuator can include a first gear section having first gear teeth, and the second rotary actuator can include a second gear section having second gear teeth configured to intermesh with the first gear teeth and coordinate reciprocal movement of the first piston with reciprocal movement of the second piston. At least one of the first housing and the second housing can be formed from a single piece of material as a unitary, one-piece housing. A unitary housing can include the first housing and the second housing, the unitary housing being formed from a single piece of material as a unitary, one-piece housing. At least one of the first piston and the second piston can have one of a square, rectangular, ovoid, elliptical, or circular shape in cross-section. The rotary actuator can include a first position module configured to determine a first rotational position of the first piston, a second position module configured to determine a second rotational position of the second piston, a control module configured to control fluid pressures in the first pressure chamber and the second pressure chamber based on the first positon and the second position, and coordinate reciprocal movement of the first piston with reciprocal movement of the second piston.

In a second aspect, a method of rotary actuation includes providing an articulated joint having a first rotary actuator having a first housing defining a first arcuate chamber comprising a first cavity and a first open end, and an arcuate-shaped first piston having a first radius of curvature and disposed in said first housing for reciprocal movement in the first arcuate chamber through the first open end and in a first plane about a first axis, wherein a first seal, the first cavity, and the first piston define a first pressure chamber, a second rotary actuator having a second housing defining a second arcuate chamber comprising a second cavity and a second open end, and an arcuate-shaped second piston having a second radius of curvature and disposed in said second housing for reciprocal movement in the second arcuate chamber through the second open end and in a second plane substantially parallel to the first plane about a second axis, wherein a second seal, the second cavity, and the second piston define a second pressure chamber, wherein a first radial side of the first piston relative to the first radius of curvature is in bearing contact with a first radial side of the second piston relative to the second radius of curvature at a contact point between the first axis and the second axis, applying pressurized fluid to the first pressure chamber, applying pressurized fluid to the second pressure chamber, urging the first piston partially outward from the first pressure chamber in a first rotational direction, urging the second piston partially outward from the second pressure chamber in a second rotational direction opposite the first rotational direction, and bearing the first piston against the second piston.

Various implementations can include some, all, or none of the following features. Bearing the first piston against the second piston can include contacting a first radial side of the first piston relative to the first radius of curvature to a first radial side of the second piston relative to the second radius of curvature at a contact point between the first axis and the second axis. The articulated joint can include a bearing member, and bearing the first piston against the second piston can include contacting the bearing member to the first radial side of the first piston, and contacting the bearing member to the first radial side of the second piston, such that the first radial side of the second piston is in indirect contact with the first radial side of the first piston through the bearing member. Urging the first piston partially outward from the first pressure chamber in the first rotational direction can include urging, by a first radial force having a first magnitude in a first radial direction, the first piston radially outward, and urging the second piston partially outward from the second pressure chamber in the second rotational direction further comprises urging, by a second radial force having a second magnitude substantially equal to the first magnitude and a second radial direction substantially opposite the first radial direction, the second piston radially outward, and wherein bearing the first piston against the second piston includes applying, by the first piston, the first radial force to the first radial side of the second piston, and applying, by the second piston, the second radial force to the first radial side of the first piston. The first radial side of the first piston can be a radially outer side of the first piston, and the first radial side of the second piston is a radially outer side of the second piston. The method can include affixing the first housing to the second housing. The method can include rotating a rotary output shaft extending from a selected one of a first axis shaft of the first rotary actuator and a second axis shaft of the second rotary actuator. The method can include actuating an arm portion extending from the first axis shaft. The first rotary actuator further can include a first gear section having first gear teeth, and the second rotary actuator can include a second gear section having second gear teeth, wherein the method also includes intermeshing the first gear teeth with the second gear teeth, urging, by movement of the first piston, movement of the first gear section relative to the second gear section, and urging, by the relative movement of the first gear section relative to the second gear section, coordinated reciprocal movement of the second piston with reciprocal movement of the first piston. The method can include determining a first rotational position signal representative of the reciprocal movement of the first piston, determining a second rotational position signal representative of the reciprocal movement of the second piston, controlling a first fluid pressure in the first pressure chamber and a second fluid pressure in the second pressure chamber based on the first positon and the second position, and coordinating reciprocal movement of the first piston with reciprocal movement of the second piston based on the first fluid pressure and the second fluid pressure.

The systems and techniques described herein may provide one or more of the following advantages. First, a system can provide increased torque output for a rotary piston actuator. Second, the system can increase the range of actuation over which useable torque is available. Third, the system can reduce the amount of wear on piston seals. Fourth, the system can increase the lifespan of piston seals and other contacting components. Fifth, the system can reduce the amount of heat generated by friction within a rotary piston actuator. Sixth, the system can increase the durability of a rotary piston actuator.

The details of one or more implementations are set forth in the accompanying drawings and the description below. Other features and advantages will be apparent from the description and drawings, and from the claims.

DESCRIPTION OF DRAWINGS

FIG. 1 is a perspective view of an example rotary piston-type actuator.

FIG. 2 is a perspective view of an example rotary piston assembly.

FIG. 3 is a perspective cross-sectional view of an example rotary piston-type actuator.

FIG. 11 is a perspective view of another example of a rotary piston-type actuator.

FIGS. 12-14 are perspective and cross-sectional views of another example rotary piston-type actuator.

FIGS. 15 and 16 are perspective and cross-sectional views of another example rotary piston-type actuator that includes another example rotary piston assembly.

FIGS. 17 and 18 are perspective and cross-sectional views of another example rotary piston-type actuator that includes another example rotary piston assembly.

FIGS. 19 and 20 are perspective and cross-sectional views of another example rotary piston-type actuator.

FIGS. 21A-21C are cross-sectional and perspective views of an example rotary piston.

FIG. 26 is a perspective view of another example rotary piston-type actuator.

FIG. 27 is a cross-sectional view of another example rotary piston assembly.

FIG. 28 is a perspective cross-sectional view of another example rotary piston-type actuator.

FIG. 29B is a perspective view of an example butterfly rotary piston actuator.

DETAILED DESCRIPTION

Figure 4:
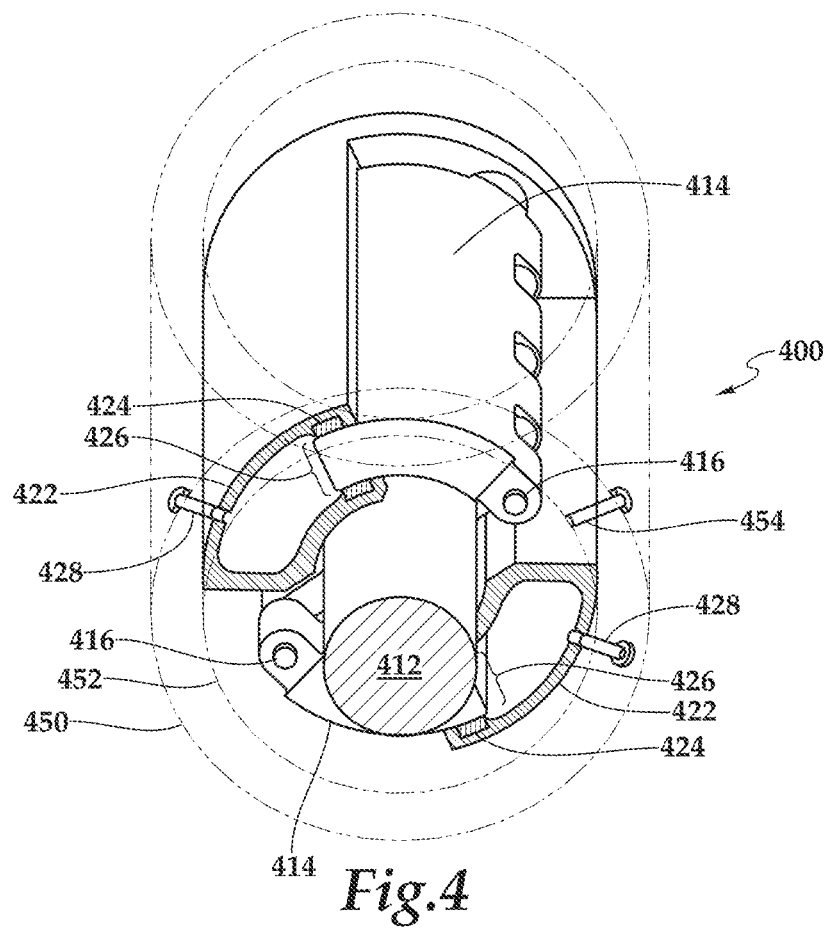
FIG. 4 is a perspective view of another example rotary piston-type actuator.

This document describes devices for producing rotary motion. In particular, this document describes devices that can convert fluid displacement into rotary motion through the use of components more commonly used for producing linear motion, e.g., hydraulic or pneumatic linear cylinders. Vane-type rotary actuators are relatively compact devices used to convert fluid motion into rotary motion. Rotary vane actuators (RVA), however, generally use seals and component configurations that exhibit cross-vane leakage of the driving fluid. Such leakage can affect the range of applications in which such designs can be used. Some applications may require a rotary actuator to hold a rotational load in a selected position for a predetermined length of time, substantially without rotational movement, when the actuator's fluid ports are blocked. For example, some aircraft applications may require that an actuator hold a flap or other control surface that is under load (e.g., through wind resistance, gravity or g-forces) at a selected position when the actuator's fluid ports are blocked. Cross-vane leakage, however, can allow movement from the selected position.

Linear pistons use relatively mature sealing technology that exhibits well-understood dynamic operation and leakage characteristics that are generally better than rotary vane actuator type seals. Linear pistons, however, require additional mechanical components in order to adapt their linear motions to rotary motions. Such linear-to-rotary mechanisms are generally larger and heavier than rotary vane actuators that are capable of providing similar rotational actions, e.g., occupying a larger work envelope. Such linear-to-rotary mechanisms may also generally be installed in an orientation that is different from that of the load they are intended to drive, and therefore may provide their torque output indirectly, e.g., installed to push or pull a lever arm that is at a generally right angle to the axis of the axis of rotation of the lever arm. Such linear-to-rotary mechanisms may therefore become too large or heavy for use in some applications, such as aircraft control where space and weight constraints may make such mechanisms impractical for use.

In general, rotary piston assemblies use curved pressure chambers and curved pistons to controllably push and pull the rotor arms of a rotor assembly about an axis. In use, certain embodiments of the rotary piston assemblies described herein can provide the positional holding characteristics generally associated with linear piston-type fluid actuators, to rotary applications, and can do so using the relatively more compact and lightweight envelopes generally associated with rotary vane actuators.

FIGS. 1-3 show various views of the components of an example rotary piston-type actuator 100. Referring to FIG. 1, a perspective view of the example rotary piston-type actuator 100 is shown. The actuator 100 includes a rotary piston assembly 200 and a pressure chamber assembly 300. The actuator 100 includes a first actuation section 110 and a second actuation section 120. In the example of actuator 100, the first actuation section 110 is configured to rotate the rotary piston assembly 200 in a first direction, e.g., counterclockwise, and the second actuation section 120 is configured to rotate the rotary piston assembly 200 in a second direction substantially opposite the first direction, e.g., clockwise.

Referring now to FIG. 2, a perspective view of the example rotary piston assembly 200 is shown apart from the pressure chamber assembly 300. The rotary piston assembly 200 includes a rotor shaft 210. A plurality of rotor arms 212 extend radially from the rotor shaft 210, the distal end of each rotor arm 212 including a bore (not shown) substantially aligned with the axis of the rotor shaft 210 and sized to accommodate one of the collection of connector pins 214.

As shown in FIG. 2, the first actuation section 110 includes a pair of rotary pistons 250, and the second actuation section 120 includes a pair of rotary pistons 260. While the example actuator 100 includes two pairs of the rotary pistons 250, 260, other embodiments can include greater and/or lesser numbers of cooperative and opposing rotary pistons. Examples of other such embodiments will be discussed below, for example, in the descriptions of FIGS. 4-25.

In the example rotary piston assembly shown in FIG. 2, each of the rotary pistons 250, 260 includes a piston end 252 and one or more connector arms 254. The piston end 252 is formed to have a generally semi-circular body having a substantially smooth surface. Each of the connector arms 254 includes a bore 256 substantially aligned with the axis of the semi-circular body of the piston end 252 and sized to accommodate one of the connector pins 214.

The rotary pistons 260 in the example assembly of FIG. 2 are oriented substantially opposite each other in the same rotational direction. The rotary pistons 250 are oriented substantially opposite each other in the same rotational direction, but opposite that of the rotary pistons 260. In some embodiments, the actuator 100 can rotate the rotor shaft 210 about 60 degrees total.

Each of the rotary pistons 250, 260 of the example assembly of FIG. 2 may be assembled to the rotor shaft 210 by aligning the connector arms 254 with the rotor arms 212 such that the bores (not shown) of the rotor arms 212 align with the bores 265. The connector pins 214 may then be inserted through the aligned bores to create hinged connections between the pistons 250, 260 and the rotor shaft 210. Each connector pin 214 is slightly longer than the aligned bores. In the example assembly, about the circumferential periphery of each end of each connector pin 214 that extends beyond the aligned bores is a circumferential recess (not shown) that can accommodate a retaining fastener (not shown), e.g., a snap ring or spiral ring.

FIG. 3 is a perspective cross-sectional view of the example rotary piston-type actuator 100. The illustrated example shows the rotary pistons 260 inserted into a corresponding pressure chamber 310 formed as an arcuate cavity in the pressure chamber assembly 300. The rotary pistons 250 are also inserted into corresponding pressure chambers 310, not visible in this view.

In the example actuator 100, each pressure chamber 310 includes a seal assembly 320 about the interior surface of the pressure chamber 310 at an open end 330. In some implementations, the seal assembly 320 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 100 may be reduced by using a standard, e.g., commercially available, semi-circular, unidirectional seal designs generally used in linear hydraulic actuators. In some embodiments, the seal assembly 320 can be a one-piece seal.

In some embodiments of the example actuator 100, the seal assembly 320 may be included as part of the rotary pistons 250, 260. For example, the seal assembly 320 may be located near the piston end 252, opposite the connector arm 254, and slide along the interior surface of the pressure chamber 310 to form a fluidic seal as the rotary piston 250, 260 moves in and out of the pressure chamber 310. An example actuator that uses such piston-mounted seal assemblies will be discussed in the descriptions of FIGS. 26-28. In some embodiments, the seal 310 can act as a bearing. For example, the seal assembly 320 may provide support for the piston 250, 260 as it moves in and out of the pressure chamber 310.

In some embodiments, the actuator 100 may include a wear member between the piston 250, 260 and the pressure chamber 310. For example, a wear ring may be included in proximity to the seal assembly 320. The wear ring may act as a pilot for the piston 250, 260, and/or act as a bearing providing support for the piston 250, 260.

In the example actuator 100, when the rotary pistons 250, 260 are inserted through the open ends 330, each of the seal assemblies 320 contacts the interior surface of the pressure chamber 310 and the substantially smooth surface of the piston end 252 to form a substantially pressure-sealed region within the pressure chamber 310. Each of the pressure chambers 310 may include a fluid port 312 formed through the pressure chamber assembly 300, through with pressurized fluid may flow. Upon introduction of pressurized fluid, e.g., hydraulic oil, water, air, gas, into the pressure chambers 310, the pressure differential between the interior of the pressure chambers 310 and the ambient conditions outside the pressure chambers 310 causes the piston ends 252 to be urged outward from the pressure chambers 310. As the piston ends 252 are urged outward, the pistons 250, 260 urge the rotary piston assembly 200 to rotate.

In the example of the actuator 100, cooperative pressure chambers may be fluidically connected by internal or external fluid ports. For example, the pressure chambers 310 of the first actuation section 110 may be fluidically interconnected to balance the pressure between the pressure chambers 310. Similarly the pressure chambers 310 of the second actuation section 120 may be fluidically interconnected to provide similar pressure balancing. In some embodiments, the pressure chambers 310 may be fluidically isolated from each other. For example, the pressure chambers 310 may each be fed by an independent supply of pressurized fluid.

In the example of the actuator 100, the use of the alternating arcuate, e.g., curved, rotary pistons 250, 260 arranged substantially opposing each other operates to translate the rotor arms in an arc-shaped path about the axis of the rotary piston assembly 200, thereby rotating the rotor shaft 210 clockwise and counter-clockwise in a substantially torque balanced arrangement. Each cooperative pair of pressure chambers 310 operates uni-directionally in pushing the respective rotary piston 250 outward, e.g., extension, to drive the rotor shaft 210 in the specific direction. To reverse direction, the opposing cylinder section's 110 pressure chambers 260 are pressurized to extend their corresponding rotary pistons 260 outward.

The pressure chamber assembly 300, as shown, includes a collection of openings 350. In general, the openings 350 provide space in which the rotor arms 212 can move when the rotor shaft 210 is partly rotated. In some implementations, the openings 350 can be formed to remove material from the pressure chamber assembly 300, e.g., to reduce the mass of the pressure chamber assembly 300. In some implementations, the openings 350 can be used during the process of assembly of the actuator 100. For example, the actuator 100 can be assembled by inserting the rotary pistons 250, 260 through the openings 350 such that the piston ends 252 are inserted into the pressure chambers 310. With the rotary pistons 250, 260 substantially fully inserted into the pressure chambers 310, the rotor shaft 210 can be assembled to the actuator 100 by aligning the rotor shaft 210 with an axial bore 360 formed along the axis of the pressure chamber assembly 300, and by aligning the rotor arms 212 with a collection of keyways 362 formed along the axis of the pressure chamber assembly 300. The rotor shaft 210 can then be inserted into the pressure chamber assembly 300. The rotary pistons 250, 260 can be partly extracted from the pressure chambers 310 to substantially align the bores 256 with the bores of the rotor arms 212. The connector pins 214 can then be passed through the keyways 362 and the aligned bores to connect the rotary pistons 250, 260 to the rotor shaft 210. The connector pins 214 can be secured longitudinally by inserting retaining fasteners through the openings 350 and about the ends of the connector pins 214. The rotor shaft 210 can be connected to an external mechanism as an output shaft in order to transfer the rotary motion of the actuator 100 to other mechanisms. A bushing or bearing 362 is fitted between the rotor shaft 210 and the axial bore 360 at each end of the pressure chamber assembly 300.

In some embodiments, the rotary pistons 250, 260 may urge rotation of the rotor shaft 210 by contacting the rotor arms 212. For example, the piston ends 252 may not be coupled to the rotor arms 212. Instead, the piston ends 252 may contact the rotor arms 212 to urge rotation of the rotor shaft as the rotary pistons 250, 260 are urged outward from the pressure chambers 310. Conversely, the rotor arms 212 may contact the piston ends 252 to urge the rotary pistons 250, 260 back into the pressure chambers 310.

In some embodiments, a rotary position sensor assembly (not shown) may be included in the actuator 100. For example, an encoder may be used to sense the rotational position of the rotor shaft 210 relative to the pressure chamber assembly or another feature that remains substantially stationary relative to the rotation of the shaft 210. In some implementations, the rotary position sensor may provide signals that indicate the position of the rotor shaft 210 to other electronic or mechanical modules, e.g., a position controller.

In use, pressurized fluid in the example actuator 100 can be applied to the pressure chambers 310 of the second actuation section 120 through the fluid ports 312. The fluid pressure urges the rotary pistons 260 out of the pressure chambers 310. This movement urges the rotary piston assembly 200 to rotate clockwise. Pressurized fluid can be applied to the pressure chambers 310 of the first actuation section 110 through the fluid ports 312. The fluid pressure urges the rotary pistons 250 out of the pressure chambers 310. This movement urges the rotary piston assembly 200 to rotate counter-clockwise. The fluid conduits can also be blocked fluidically to cause the rotary piston assembly 200 to substantially maintain its rotary position relative to the pressure chamber assembly 300.

In some embodiments of the example actuator 100, the pressure chamber assembly 300 can be formed from a single piece of material. For example, the pressure chambers 310, the openings 350, the fluid ports 312, the keyways 362, and the axial bore 360 may be formed by molding, machining, or otherwise forming a unitary piece of material.

FIG. 4 is a perspective view of another example rotary piston-type actuator 400. In general, the actuator 400 is similar to the actuator 100, but instead of using opposing pairs of rotary pistons 250, 260, each acting uni-directionally to provide clockwise and counter-clockwise rotation, the actuator 400 uses a pair of bidirectional rotary pistons.

As shown in FIG. 4, the actuator 400 includes a rotary piston assembly that includes a rotor shaft 412 and a pair of rotary pistons 414. The rotor shaft 412 and the rotary pistons 414 are connected by a pair of connector pins 416.

The example actuator shown in FIG. 4 includes a pressure chamber assembly 420. The pressure chamber assembly 420 includes a pair of pressure chambers 422 formed as arcuate cavities in the pressure chamber assembly 420. Each pressure chamber 422 includes a seal assembly 424 about the interior surface of the pressure chamber 422 at an open end 426. The seal assemblies 424 contact the inner walls of the pressure chambers 422 and the rotary pistons 414 to form fluidic seals between the interiors of the pressure chambers 422 and the space outside. A pair of fluid ports 428 is in fluidic communication with the pressure chambers 422. In use, pressurized fluid can be applied to the fluid ports 428 to urge the rotary pistons 414 partly out of the pressure chambers 422, and to urge the rotor shaft 412 to rotate in a first direction, e.g., clockwise in this example.

The pressure chamber assembly 420 and the rotor shaft 412 and rotary pistons 414 of the rotary piston assembly may be structurally similar to corresponding components found in to the second actuation section 120 of the actuator 100. In use, the example actuator 400 also functions substantially similarly to the actuator 100 when rotating in a first direction when the rotary pistons 414 are being urged outward from the pressure chambers 422. e.g., clockwise in this example. As will be discussed next, the actuator 400 differs from the actuator 100 in the way that the rotor shaft 412 is made to rotate in a second direction, e.g., counter-clockwise in this example.

To provide actuation in the second direction, the example actuator 400 includes an outer housing 450 with a bore 452. The pressure chamber assembly 420 is formed to fit within the bore 452. The bore 452 is fluidically sealed by a pair of end caps (not shown). With the end caps in place, the bore 452 becomes a pressurizable chamber. Pressurized fluid can flow to and from the bore 452 through a fluid port 454. Pressurized fluid in the bore 452 is separated from fluid in the pressure chambers 422 by the seals 426.

Figure 5:
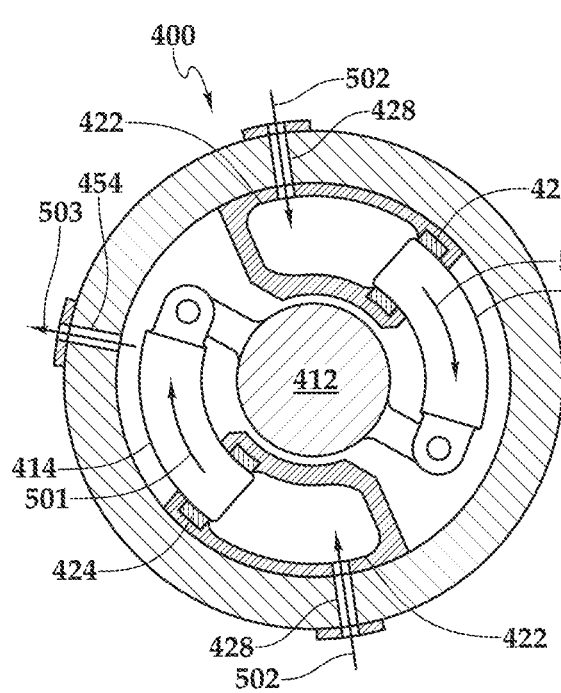
FIGS. 5 and 6 are cross-sectional views of an example rotary piston-type actuator.

Referring now to FIG. 5, the example actuator 400 is shown in a first configuration in which the rotor shaft 412 has been rotated in a first direction, e.g., clockwise, as indicated by the arrows 501. The rotor shaft 412 can be rotated in the first direction by flowing pressurized fluid into the pressure chambers 422 through the fluid ports 428, as indicated by the arrows 502. The pressure within the pressure chambers 422 urges the rotary pistons 414 partly outward from the pressure chambers 422 and into the bore 452. Fluid within the bore 452, separated from the fluid within the pressure chambers 422 by the seals 424 and displaced by the movement of the rotary pistons 414, is urged to flow out the fluid port 454, as indicated by the arrow 503.

Figure 6:
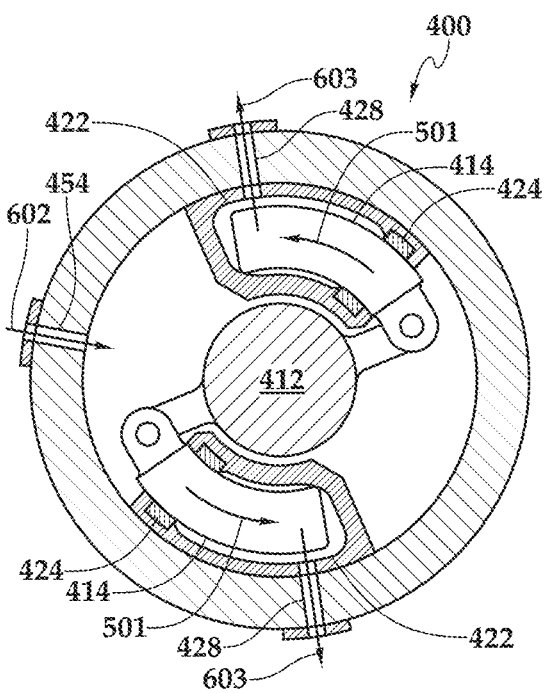

Referring now to FIG. 6, the example actuator 400 is shown in a second configuration in which the rotor shaft 412 has been rotated in a second direction, e.g., counter-clockwise, as indicated by the arrows 601. The rotor shaft 412 can be rotated in the second direction by flowing pressurized fluid into the bore 452 through the fluid port 454, as indicated by the arrow 602. The pressure within the bore 452 urges the rotary pistons 414 partly into the pressure chambers 422 from the bore 452. Fluid within the pressure chambers 422, separated from the fluid within the bore 452 by the seals 424 and displaced by the movement of the rotary pistons 414, is urged to flow out the fluid ports 428, as indicated by the arrows 603. In some embodiments, one or more of the fluid ports 428 and 454 can be oriented radially relative to the axis of the actuator 400, as illustrated in FIGS. 4-6, however in some embodiments one or more of the fluid ports 428 and 454 can be oriented parallel to the axis of the actuator 400 or in any other appropriate orientation.

Figure 7:
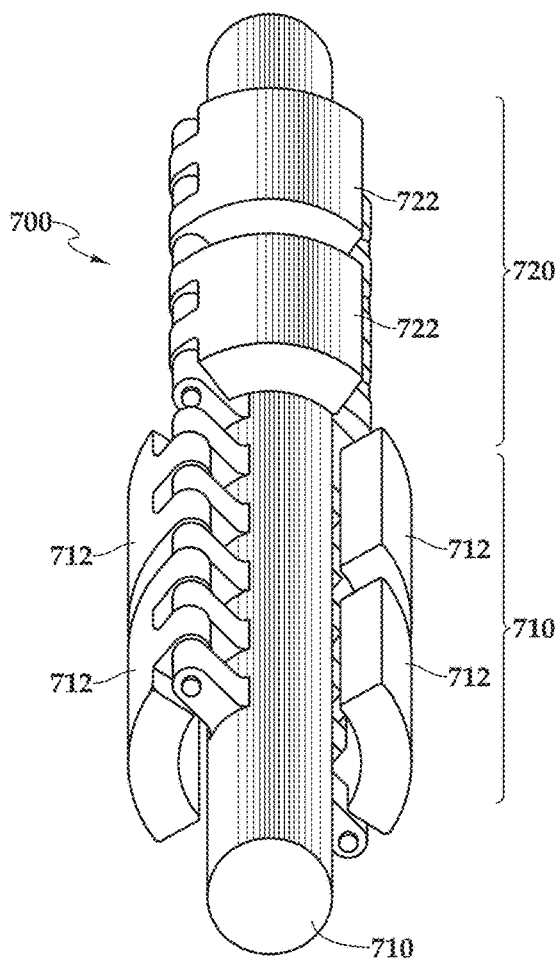
FIG. 7 is a perspective view of another embodiment of a rotary piston-type actuator.

FIG. 7 is a perspective view of another embodiment of a rotary piston assembly 700. In the example actuator 100 of FIG. 1, two opposing pairs of rotary pistons were used, but in other embodiments other numbers and configurations of rotary pistons and pressure chambers can be used. In the example of the assembly 700, a first actuation section 710 includes four rotary pistons 712 cooperatively operable to urge a rotor shaft 701 in a first direction. A second actuation section 720 includes four rotary pistons 722 cooperatively operable to urge the rotor shaft 701 in a second direction.

Although examples using four rotary pistons, e.g., actuator 100, and eight rotary pistons, e.g., assembly 700, have been described, other configurations may exist. In some embodiments, any appropriate number of rotary pistons may be used in cooperation and/or opposition. In some embodiments, opposing rotary pistons may not be segregated into separate actuation sections, e.g., the actuation sections 710 and 720. While cooperative pairs of rotary pistons are used in the examples of actuators 100, 400, and assembly 700, other embodiments exist. For example, clusters of two, three, four, or more cooperative or oppositional rotary pistons and pressure chambers may be arranged radially about a section of a rotor shaft. As will be discussed in the descriptions of FIGS. 8-10, a single rotary piston may be located at a section of a rotor shaft. In some embodiments, cooperative rotary pistons may be interspersed alternatingly with opposing rotary pistons. For example, the rotary pistons 712 may alternate with the rotary pistons 722 along the rotor shaft 701.

Figure 8:
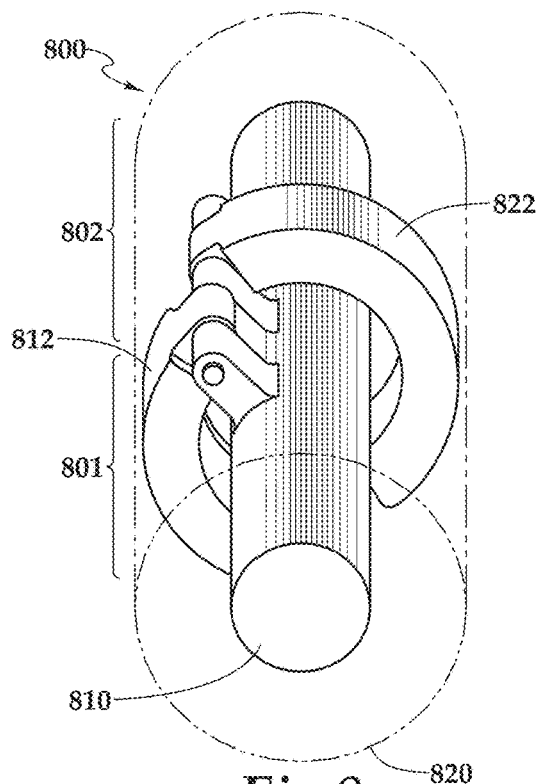
FIG. 8 is a perspective view of another example of a rotary piston-type actuator.

FIG. 8 is a perspective view of another example of a rotary piston-type actuator 800. The actuator 800 differs from the example actuators 100 and 400, and the example assembly 700 in that instead of implementing cooperative pairs of rotary pistons along a rotor shaft, e.g., two of the rotary pistons 250 are located radially about the rotor shaft 210, individual rotary pistons are located along a rotor shaft.

The example actuator 800 includes a rotor shaft 810 and a pressure chamber assembly 820. The actuator 800 includes a first actuation section 801 and a second actuation section 802. In the example actuator 800, the first actuation section 801 is configured to rotate the rotor shaft 810 in a first direction, e.g., clockwise, and the second actuation section 802 is configured to rotate the rotor shaft 810 in a second direction substantially opposite the first direction, e.g., counter-clockwise.

The first actuation section 801 of example actuator 800 includes a rotary piston 812, and the second actuation section 802 includes a rotary piston 822. By implementing a single rotary piston 812, 822 at a given longitudinal position along the rotor shaft 810, a relatively greater range of rotary travel may be achieved compared to actuators that use pairs of rotary pistons at a given longitudinal position along the rotary piston assembly, e.g., the actuator 100. In some embodiments, the actuator 800 can rotate the rotor shaft 810 about 145 degrees total.

In some embodiments, the use of multiple rotary pistons 812, 822 along the rotor shaft 810 can reduce distortion of the pressure chamber assembly 820, e.g., reduce bowing out under high pressure. In some embodiments, the use of multiple rotary pistons 812, 822 along the rotor shaft 810 can provide additional degrees of freedom for each piston 812, 822. In some embodiments, the use of multiple rotary pistons 812, 822 along the rotor shaft 810 can reduce alignment issues encountered during assembly or operation. In some embodiments, the use of multiple rotary pistons 812, 822 along the rotor shaft 810 can reduce the effects of side loading of the rotor shaft 810.

Figure 9:
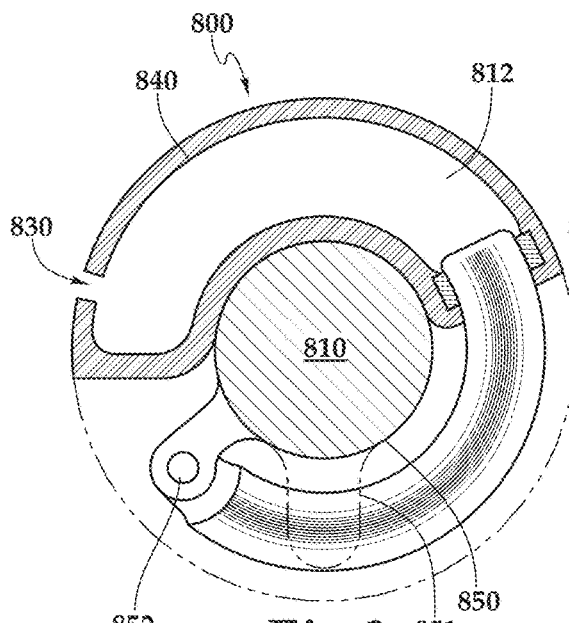
FIGS. 9 and 10 show and example rotary piston-type actuator in example extended and retracted configurations.

FIG. 9 shows the example actuator 800 with the rotary piston 812 in a substantially extended configuration. A pressurized fluid is applied to a fluid port 830 to pressurize an arcuate pressure chamber 840 formed in the pressure chamber assembly 820. Pressure in the pressure chamber 840 urges the rotary piston 812 partly outward, urging the rotor shaft 810 to rotate in a first direction, e.g., clockwise.

Figure 10:
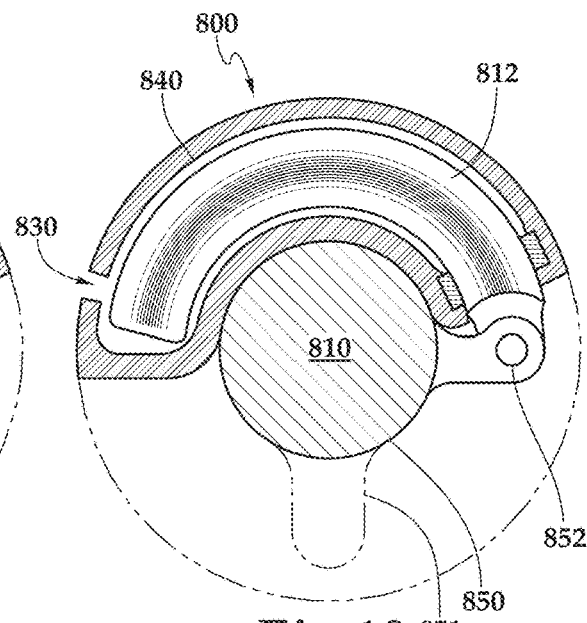

FIG. 10 shows the example actuator 800 with the rotary piston 812 in a substantially retracted configuration. Mechanical rotation of the rotor shaft 810, e.g., pressurization of the actuation section 820, urges the rotary piston 812 partly inward, e.g., clockwise. Fluid in the pressure chamber 840 displaced by the rotary piston 812 flows out through the fluid port 830.

The example actuator 800 can be assembled by inserting the rotary piston 812 into the pressure chamber 840. Then the rotor shaft 810 can be inserted longitudinally through a bore 850 and a keyway 851. The rotary piston 812 is connected to the rotor shaft 810 by a connecting pin 852.

FIG. 11 is a perspective view of another example of a rotary piston-type actuator 1100. In general, the actuator 1100 is similar to the example actuator 800, except multiple rotary pistons are used in each actuation section.

The example actuator 1100 includes a rotary piston assembly 1110 and a pressure chamber assembly 1120. The actuator 1100 includes a first actuation section 1101 and a second actuation section 1102. In the example of actuator 1100, the first actuation section 1101 is configured to rotate the rotary piston assembly 1110 in a first direction, e.g., clockwise, and the second actuation section 1102 is configured to rotate the rotary piston assembly 1110 in a second direction substantially opposite the first direction, e.g., counter-clockwise.

The first actuation section 1101 of example actuator 1100 includes a collection of rotary pistons 812, and the second actuation section 1102 includes a collection of rotary pistons 822. By implementing individual rotary pistons 812, 822 at various longitudinal positions along the rotary piston assembly 1110, a range of rotary travel similar to the actuator 800 may be achieved. In some embodiments, the actuator 1100 can rotate the rotor shaft 1110 about 60 degrees total.

In some embodiments, the use of the collection of rotary pistons 812 may provide mechanical advantages in some applications. For example, the use of multiple rotary pistons 812 may reduce stress or deflection of the rotary piston assembly, may reduce wear of the seal assemblies, or may provide more degrees of freedom. In another example, providing partitions, e.g., webbing, between chambers can add strength to the pressure chamber assembly 1120 and can reduce bowing out of the pressure chamber assembly 1120 under high pressure. In some embodiments, placement of an end tab on the rotor shaft assembly 1110 can reduce cantilever effects experienced by the actuator 800 while under load, e.g., less stress or bending.

FIGS. 12-14 are perspective and cross-sectional views of another example rotary piston-type actuator 1200. The actuator 1200 includes a rotary piston assembly 1210, a first actuation section 1201, and a second actuation section 1202.

The rotary piston assembly 1210 of example actuator 1200 includes a rotor shaft 1212, a collection of rotor arms 1214, and a collection of dual rotary pistons 1216. Each of the dual rotary pistons 1216 includes a connector section 1218 a piston end 1220a and a piston end 1220b. The piston ends 1220a-1220b are arcuate in shape, and are oriented opposite to each other in a generally semicircular arrangement, and are joined at the connector section 1218. A bore 1222 is formed in the connector section 1218 and is oriented substantially parallel to the axis of the semicircle formed by the piston ends 1220a-1220b. The bore 1222 is sized to accommodate a connector pin (not shown) that is passed through the bore 1222 and a collection of bores 1224 formed in the rotor arms 1213 to secure each of the dual rotary pistons 1216 to the rotor shaft 1212.

The first actuation section 1201 of example actuator 1200 includes a first pressure chamber assembly 1250a, and the second actuation section 1202 includes a second pressure chamber assembly 1250b. The first pressure chamber assembly 1250a includes a collection of pressure chambers 1252a formed as arcuate cavities in the first pressure chamber assembly 1250a. The second pressure chamber assembly 1250b includes a collection of pressure chambers 1252b formed as arcuate cavities in the first pressure chamber assembly 1250b. When the pressure chamber assemblies 1250a-1250b are assembled into the actuator 1200, each of the pressure chambers 1252a lies generally in a plane with a corresponding one of the pressure chambers 1252b, such that a pressure chamber 1252a and a pressure chamber 1252b occupy two semicircular regions about a central axis. A semicircular bore 1253a and a semicircular bore 1253b substantially align to accommodate the rotor shaft 1212.

Each of the pressure chambers 1252a-1252b of example actuator 1200 includes an open end 1254 and a seal assembly 1256. The open ends 1254 are formed to accommodate the insertion of the piston ends 1220a-1220b. The seal assemblies 1256 contact the inner walls of the pressure chambers 1252a-1252b and the outer surfaces of the piston ends 1220a-1220b to form a fluidic seal.

The rotary piston assembly 1210 of example actuator 1200 can be assembled by aligning the bores 1222 of the dual rotary pistons 1216 with the bores 1224 of the rotor arms 1214. The connector pin (not shown) is passed through the bores 1222 and 1224 and secured longitudinally by retaining fasteners.

The example actuator 1200 can be assembled by positioning the rotor shaft 1212 substantially adjacent to the semicircular bore 1253a and rotating it to insert the piston ends 1220*a* substantially fully into the pressure chambers 1252*a*. The second pressure chamber 1252*b* is positioned adjacent to the first pressure chamber 1252*a* such that the semicircular bore 1253*b* is positioned substantially adjacent to the rotor shaft 1212. The rotary piston assembly 1210 is then rotated to partly insert the piston ends 1220*b* into the pressure chambers 1252*b*. An end cap 1260 is fastened to the longitudinal ends 1262*a* of the pressure chambers 1252*a*-1252*b*. A second end cap (not shown) is fastened to the longitudinal ends 1262*b* of the pressure chambers 1252*a*-1252*b*. The end caps substantially maintain the positions of the rotary piston assembly 1210 and the pressure chambers 1252*a*-1252*b* relative to each other. In some embodiments, the actuator 1200 can provide about 90 degrees of total rotational stroke.

In operation, pressurized fluid is applied to the pressure chambers 1252*a* of example actuator 1200 to rotate the rotary piston assembly 1210 in a first direction, e.g., clockwise. Pressurized fluid is applied to the pressure chambers 1252*b* to rotate the rotary piston assembly 1210 in a second direction, e.g., counter-clockwise.

FIGS. 15 and 16 are perspective and cross-sectional views of another example rotary piston-type actuator 1500 that includes another example rotary piston assembly 1501. In some embodiments, the assembly 1501 can be an alternative embodiment of the rotary piston assembly 200 of FIG. 2.

The assembly 1501 of example actuator 1500 includes a rotor shaft 1510 connected to a collection of rotary pistons 1520*a* and a collection of rotary pistons 1520*b* by a collection of rotor arms 1530 and one or more connector pins (not shown). The rotary pistons 1520*a* and 1520*b* are arranged along the rotor shaft 1510 in a generally alternating pattern, e.g., one rotary piston 1520*a*, one rotary piston 1520*b*, one rotary piston 1520*a*, one rotary piston 1520*b*. In some embodiments, the rotary pistons 1520*a* and 1520*b* may be arranged along the rotor shaft 1510 in a generally intermeshed pattern, e.g., one rotary piston 1520*a* and one rotary piston 1520*b* rotationally parallel to each other, with connector portions formed to be arranged side-by-side or with the connector portion of rotary piston 1520*a* formed to one or more male protrusions and/or one or more female recesses to accommodate one or more corresponding male protrusions and/or one or more corresponding female recesses formed in the connector portion of the rotary piston 1520*b*.

Referring to FIG. 16, a pressure chamber assembly 1550 of example actuator 1500 includes a collection of arcuate pressure chambers 1555*a* and a collection of arcuate pressure chambers 1555*b*. The pressure chambers 1555*a* and 1555*b* are arranged in a generally alternating pattern corresponding to the alternating pattern of the rotary pistons 1520*a*-1520*b*. The rotary pistons 1520*a*-1520*b* extend partly into the pressure chambers 1555*a*-1555*b*. A seal assembly 1560 is positioned about an open end 1565 of each of the pressure chambers 1555*a*-1555*b* to form fluidic seals between the inner walls of the pressure chambers 1555*a*-1555*b* and the rotary pistons 1520*a*-1520*b*.

In use, pressurized fluid can be alternatingly provided to the pressure chambers 1555*a* and 1555*b* of example actuator 1500 to urge the rotary piston assembly 1501 to rotate partly clockwise and counterclockwise. In some embodiments, the actuator 1500 can rotate the rotor shaft 1510 about 92 degrees total.

FIGS. 17 and 18 are perspective and cross-sectional views of another example rotary piston-type actuator 1700 that includes another example rotary piston assembly 1701. In some embodiments, the assembly 1701 can be an alternative embodiment of the rotary piston assembly 200 of FIG. 2 or the assembly 1200 of FIG. 12.

The assembly 1701 of example actuator 1700 includes a rotor shaft 1710 connected to a collection of rotary pistons 1720*a* by a collection of rotor arms 1730*a* and one or more connector pins 1732. The rotor shaft 1710 is also connected to a collection of rotary pistons 1720*b* by a collection of rotor arms 1730*b* and one or more connector pins 1732. The rotary pistons 1720*a* and 1720*b* are arranged along the rotor shaft 1710 in a generally opposing, symmetrical pattern, e.g., one rotary piston 1720*a* is paired with one rotary piston 1720*b* at various positions along the length of the assembly 1701.

Referring to FIG. 18, a pressure chamber assembly 1750 of example actuator 1700 includes a collection of arcuate pressure chambers 1755*a* and a collection of arcuate pressure chambers 1755*b*. The pressure chambers 1755*a* and 1755*b* are arranged in a generally opposing, symmetrical pattern corresponding to the symmetrical arrangement of the rotary pistons 1720*a*-1720*b*. The rotary pistons 1720*a*-1720*b* extend partly into the pressure chambers 1755*a*-1755*b*. A seal assembly 1760 is positioned about an open end 1765 of each of the pressure chambers 1755*a*-1755*b* to form fluidic seals between the inner walls of the pressure chambers 1755*a*-1755*b* and the rotary pistons 1720*a*-1720*b*.

In use, pressurized fluid can be alternatingly provided to the pressure chambers 1755*a* and 1755*b* of example actuator 1700 to urge the rotary piston assembly 1701 to rotate partly clockwise and counterclockwise. In some embodiments, the actuator 1700 can rotate the rotor shaft 1710 about 52 degrees total.

FIGS. 19 and 20 are perspective and cross-sectional views of another example rotary piston-type actuator 1900. Whereas the actuators described previously, e.g., the example actuator 100 of FIG. 1, are generally elongated and cylindrical, the actuator 1900 is comparatively flatter and more disk-shaped.

Referring to FIG. 19, a perspective view of the example rotary piston-type actuator 1900 is shown. The actuator 1900 includes a rotary piston assembly 1910 and a pressure chamber assembly 1920. The rotary piston assembly 1910 includes a rotor shaft 1912. A collection of rotor arms 1914 extend radially from the rotor shaft 1912, the distal end of each rotor arm 1914 including a bore 1916 aligned substantially parallel with the axis of the rotor shaft 1912 and sized to accommodate one of a collection of connector pins 1918.

The rotary piston assembly 1910 of example actuator 1900 includes a pair of rotary pistons 1930 arranged substantially symmetrically opposite each other across the rotor shaft 1912. In the example of the actuator 1900, the rotary pistons 1930 are both oriented in the same rotational direction, e.g., the rotary pistons 1930 cooperatively push in the same rotational direction. In some embodiments, a return force may be provided to rotate the rotary piston assembly 1910 in the direction of the rotary pistons 1930. For example, the rotor shaft 1912 may be coupled to a load that resists the forces provided by the rotary pistons 1930, such as a load under gravitational pull, a load exposed to wind or water resistance, a return spring, or any other appropriate load that can rotate the rotary piston assembly. In some embodiments, the actuator 1900 can include a pressurizable outer housing over the pressure chamber assembly 1920 to provide a back-drive operation, e.g., similar to the function provided by the outer housing 450 in FIG. 4. In some embodiments, the actuator 1900 can be rotationally coupled to an oppositely oriented actuator 1900 that can provide a back-drive operation.

In some embodiments, the rotary pistons 1930 can be oriented in opposite rotational directions, e.g., the rotary pistons 1930 can oppose each other push in the opposite rotational directions to provide bidirectional motion control. In some embodiments, the actuator 100 can rotate the rotor shaft about 60 degrees total.

Each of the rotary pistons 1930 of example actuator 1900 includes a piston end 1932 and one or more connector arms 1934. The piston end 1932 is formed to have a generally semi-circular body having a substantially smooth surface. Each of the connector arms 1934 includes a bore 1936 (see FIGS. 21B and 21C) substantially aligned with the axis of the semi-circular body of the piston end 1932 and sized to accommodate one of the connector pins 1918.

Each of the rotary pistons 1930 of example actuator 1900 is assembled to the rotor shaft 1912 by aligning the connector arms 1934 with the rotor arms 1914 such that the bores 1916 of the rotor arms 1914 align with the bores 1936. The connector pins 1918 are inserted through the aligned bores to create hinged connections between the pistons 1930 and the rotor shaft 1912. Each connector pin 1916 is slightly longer than the aligned bores. About the circumferential periphery of each end of each connector pin 1916 that extends beyond the aligned bores is a circumferential recess (not shown) that can accommodate a retaining fastener (not shown), e.g., a snap ring or spiral ring.

Referring now to FIG. 20 a cross-sectional view of the example rotary piston-type actuator 1900 is shown. The illustrated example shows the rotary pistons 1930 partly inserted into a corresponding pressure chamber 1960 formed as an arcuate cavity in the pressure chamber assembly 1920.

Each pressure chamber 1960 of example actuator 1900 includes a seal assembly 1962 about the interior surface of the pressure chamber 1960 at an open end 1964. In some embodiments, the seal assembly 1962 can be a circular or semi-circular sealing geometry retained on all sides in a standard seal groove.

When the rotary pistons 1930 of example actuator 1900 are inserted through the open ends 1964, each of the seal assemblies 1962 contacts the interior surface of the pressure chamber 1960 and the substantially smooth surface of the piston end 1932 to form a substantially pressure-sealed region within the pressure chamber 1960. Each of the pressure chambers 1960 each include a fluid port (not shown) formed through the pressure chamber assembly 1920, through with pressurized fluid may flow.

Upon introduction of pressurized fluid, e.g., hydraulic oil, water, air, gas, into the pressure chambers 1960 of example actuator 1900, the pressure differential between the interior of the pressure chambers 1960 and the ambient conditions outside the pressure chambers 1960 causes the piston ends 1932 to be urged outward from the pressure chambers 1960. As the piston ends 1932 are urged outward, the pistons 1930 urge the rotary piston assembly 1910 to rotate.

In the illustrated example actuator 1900, each of the rotary pistons 1930 includes a cavity 1966. FIGS. 21A-21C provide additional cross-sectional and perspective views of one of the rotary pistons 1930. Referring to FIG. 21A, a cross-section the rotary piston 1930, taken across a section of the piston end 1932 is shown. The cavity 1966 is formed within the piston end 1932. Referring to FIG. 21B, the connector arm 1934 and the bore 1936 is shown in perspective. FIG. 21C features a perspective view of the cavity 1966.

In some embodiments, the cavity 1966 may be omitted. For example, the piston end 1932 may be solid in cross-section. In some embodiments, the cavity 1966 may be formed to reduce the mass of the rotary piston 1930 and the mass of the actuator 1900. For example, the actuator 1900 may be implemented in an aircraft application, where weight may play a role in actuator selection. In some embodiments, the cavity 1966 may reduce wear on seal assemblies, such as the seal assembly 320 of FIG. 3. For example, by reducing the mass of the rotary piston 1930, the amount of force the piston end 1932 exerts upon the corresponding seal assembly may be reduced when the mass of the rotary piston is accelerated, e.g., by gravity or G-forces.

In some embodiments, the cavity 1966 may be substantially hollow in cross-section, and include one or more structural members, e.g., webs, within the hollow space. For example, structural cross-members may extend across the cavity of a hollow piston to reduce the amount by which the piston may distort, e.g., bowing out, when exposed to a high pressure differential across the seal assembly.

Figure 22:
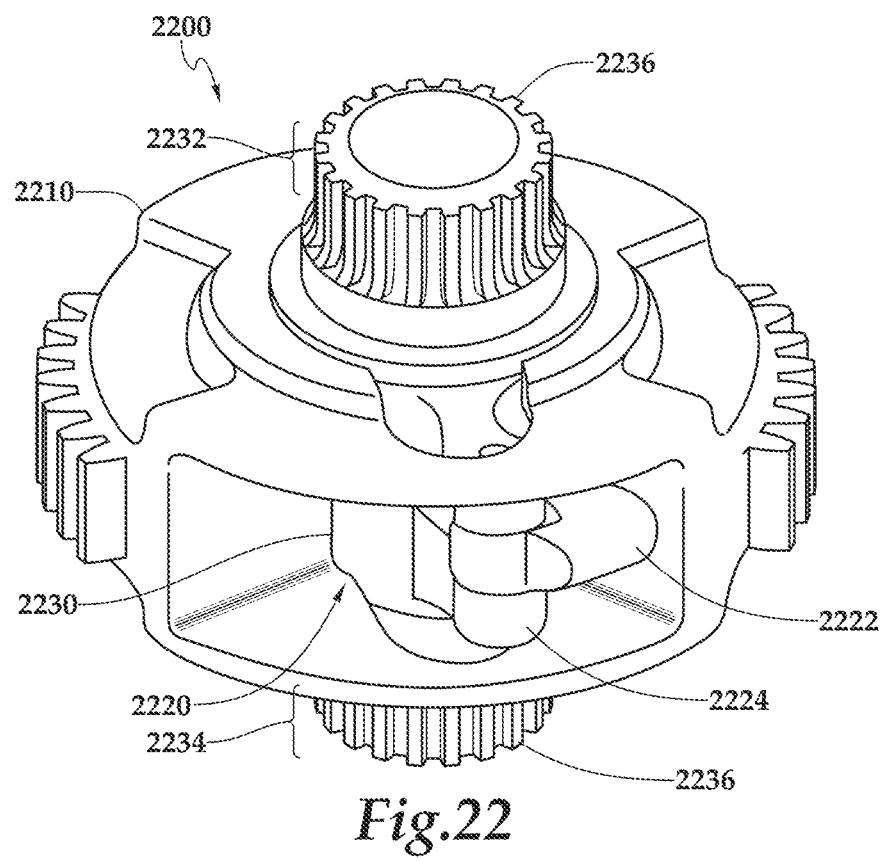
FIGS. 22 and 23 illustrate a comparison of two example rotor shaft embodiments.
Figure 23:
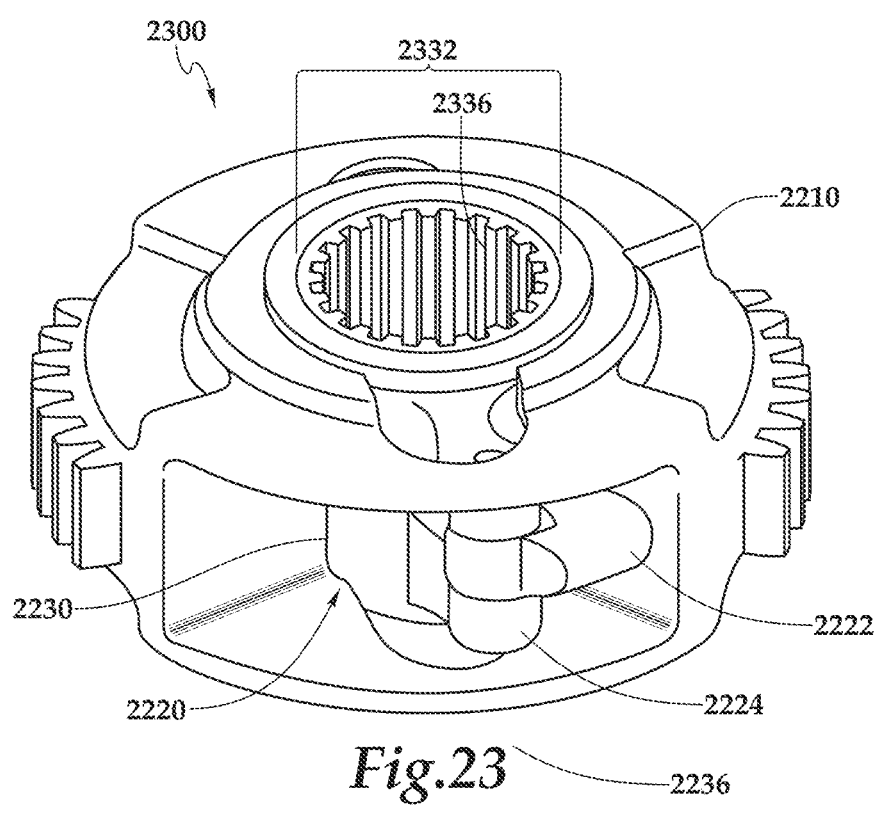

FIGS. 22 and 23 illustrate a comparison of two example rotor shaft embodiments. FIG. 22 is a perspective view of an example rotary piston-type actuator 2200. In some embodiments, the example actuator 2200 can be the example actuator 1900.

The example actuator 2200 includes a pressure chamber assembly 2210 and a rotary piston assembly 2220. The rotary piston assembly 2220 includes at least one rotary piston 2222 and one or more rotor arms 2224. The rotor arms 2224 extend radially from a rotor shaft 2230.

The rotor shaft 2230 of example actuator includes an output section 2232 and an output section 2234 that extend longitudinally from the pressure chamber assembly 2210. The output sections 2232-2234 include a collection of splines 2236 extending radially from the circumferential periphery of the output sections 2232-2234. In some implementations, the output section 2232 and/or 2234 may be inserted into a correspondingly formed splined assembly to rotationally couple the rotor shaft 2230 to other mechanisms. For example, by rotationally coupling the output section 2232 and/or 2234 to an external assembly, the rotation of the rotary piston assembly 2220 may be transferred to urge the rotation of the external assembly.

FIG. 23 is a perspective view of another example rotary piston-type actuator 2300. The actuator 2300 includes the pressure chamber assembly 2210 and a rotary piston assembly 2320. The rotary piston assembly 2320 includes at least one of the rotary pistons 2222 and one or more of the rotor arms 2224. The rotor arms 2224 extend radially from a rotor shaft 2330.

The rotor shaft 2330 of example actuator 2300 includes a bore 2332 formed longitudinally along the axis of the rotor shaft 2330. The rotor shaft 2330 includes a collection of splines 2336 extending radially inward from the circumferential periphery of the bore 2332. In some embodiments, a correspondingly formed splined assembly may be inserted into the bore 2332 to rotationally couple the rotor shaft 2330 to other mechanisms.

Figure 24:
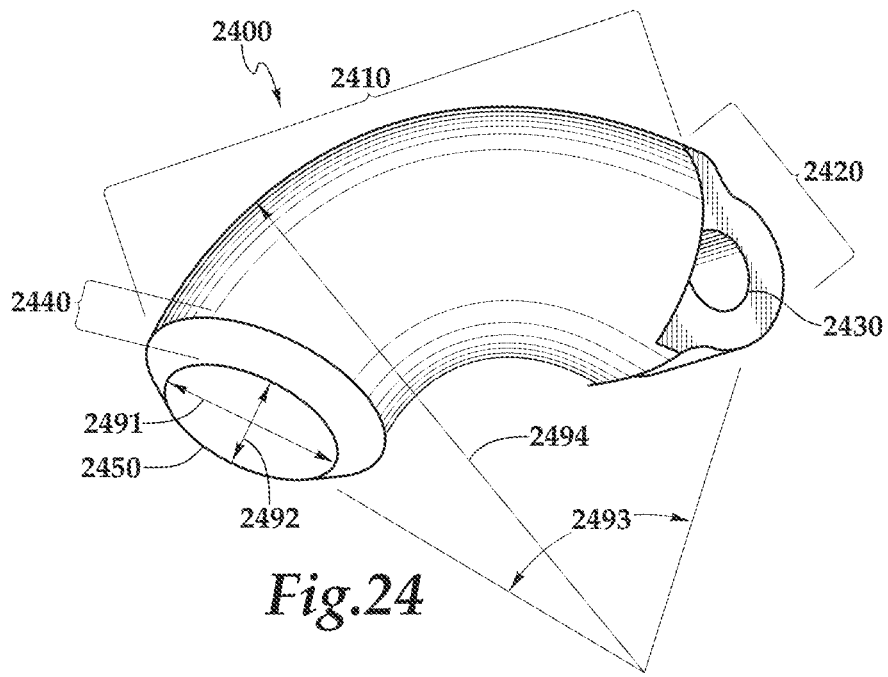
FIG. 24 is a perspective view of another example rotary piston.

FIG. 24 is a perspective view of another example rotary piston 2400. In some embodiments, the rotary piston 2400 can be the rotary piston 250, 260, 414, 712, 812, 822, 1530*a*, 1530*b*, 1730*a*, 1730*b*, 1930 or 2222.

The example rotary piston 2400 includes a piston end 2410 and a connector section 2420. The connector section 2420 includes a bore 2430 formed to accommodate a connector pin, e.g., the connector pin 214.

The piston end 2410 of example actuator 2400 includes an end taper 2440. The end taper 2440 is formed about the periphery of a terminal end 2450 of the piston end 2410. The end taper 2440 is formed at a radially inward angle starting at the outer periphery of the piston end 2410 and ending at the terminal end 2450. In some implementations, the end taper 2440 can be formed to ease the process of inserting the rotary piston 2400 into a pressure chamber, e.g., the pressure chamber 310.

The piston end 2410 of example actuator 2400 is substantially smooth. In some embodiments, the smooth surface of the piston end 2410 can provide a surface that can be contacted by a seal assembly. For example, the seal assembly 320 can contact the smooth surface of the piston end 2410 to form part of a fluidic seal, reducing the need to form a smooth, fluidically sealable surface on the interior walls of the pressure chamber 310.

In the illustrated example, the rotary piston 2400 is shown as having a generally solid circular cross-section, whereas the rotary pistons piston 250, 260, 414, 712, 812, 822, 1530a, 1530b, 1730a, 1730b, 1930 or 2222 have been illustrated as having various generally rectangular, elliptical, and other shapes, both solid and hollow, in cross section. In some embodiments, the cross sectional dimensions of the rotary piston 2400, as generally indicated by the arrows 2491 and 2492, can be adapted to any appropriate shape, e.g., square, rectangular, ovoid, elliptical, circular, and other shapes, both solid and hollow, in cross section. In some embodiments, the arc of the rotary piston 2400, as generally indicated by the angle 2493, can be adapted to any appropriate length. In some embodiments, the radius of the rotary piston 2400, as generally indicated by the line 2494, can be adapted to any appropriate radius. In some embodiments, the piston end 2410 can be substantially solid, substantially hollow, or can include any appropriate hollow formation. In some embodiments, any of the previously mentioned forms of the piston end 2410 can also be used as the piston ends 1220a and/or 1220b of the dual rotary pistons 1216 of FIG. 12.

Figure 25:
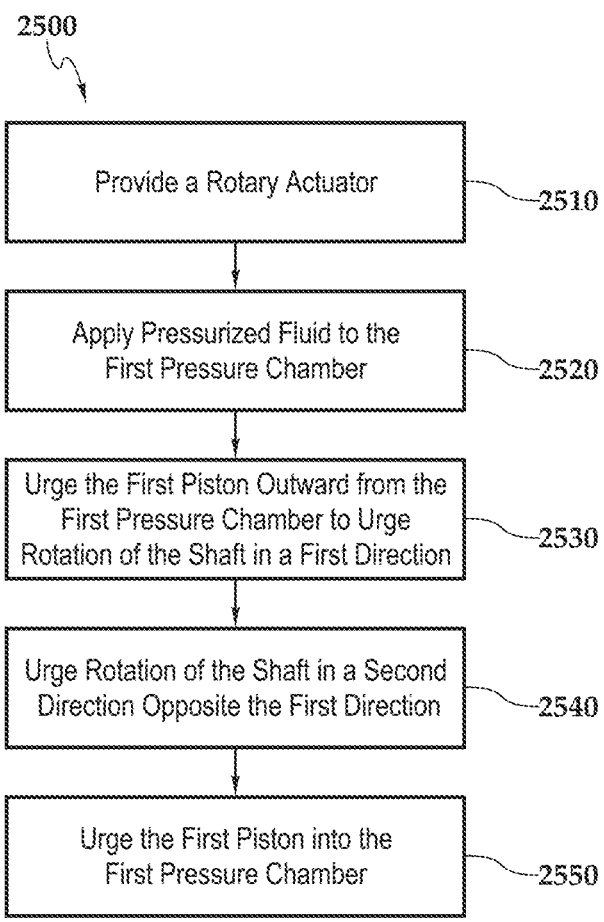
FIG. 25 is a flow diagram of an example process for performing rotary actuation.

FIG. 25 is a flow diagram of an example process 2500 for performing rotary actuation. In some implementations, the process 2500 can be performed by the rotary piston-type actuators 100, 400, 700, 800, 1200, 1500, 1700, 1900, 2200, 2300, and/or 2600 which will be discussed in the descriptions of FIGS. 26-28.

At 2510, a rotary actuator is provided. The rotary actuator of example actuator 2500 includes a first housing defining a first arcuate chamber including a first cavity, a first fluid port in fluid communication with the first cavity, an open end, and a first seal disposed about an interior surface of the open end, a rotor assembly rotatably journaled in the first housing and including a rotary output shaft and a first rotor arm extending radially outward from the rotary output shaft, an arcuate-shaped first piston disposed in the first housing for reciprocal movement in the first arcuate chamber through the open end. The first seal, the first cavity, and the first piston define a first pressure chamber, and a first connector, coupling a first end of the first piston to the first rotor arm. For example, the actuator 100 includes the components of the pressure chamber assembly 300 and the rotary piston assembly 200 included in the actuation section 120.

At 2520, a pressurized fluid is applied to the first pressure chamber. For example, pressurized fluid can be flowed through the fluid port 320 into the pressure chamber 310.

At 2530, the first piston is urged partially outward from the first pressure chamber to urge rotation of the rotary output shaft in a first direction. For example, a volume of pressurized fluid flowed into the pressure chamber 310 will displace a similar volume of the rotary piston 260, causing the rotary piston 260 to be partly urged out of the pressure cavity 310, which in turn will cause the rotor shaft 210 to rotate clockwise.

At 2540, the rotary output shaft is rotated in a second direction opposite that of the first direction. For example, the rotor shaft 210 can be rotated counter-clockwise by an external force, such as another mechanism, a torque-providing load, a return spring, or any other appropriate source of rotational torque.

At 2550, the first piston is urged partially into the first pressure chamber to urge pressurized fluid out the first fluid port. For example, the rotary piston 260 can be pushed into the pressure chamber 310, and the volume of the piston end 252 extending into the pressure chamber 310 will displace a similar volume of fluid, causing it to flow out the fluid port 312.

In some embodiments, the example process 2500 can be used to provide substantially constant power over stroke to a connected mechanism. For example, as the actuator 100 rotates, there may be substantially little position-dependent variation in the torque delivered to a connected load.

In some embodiments, the first housing further defines a second arcuate chamber comprising a second cavity, a second fluid port in fluid communication with the second cavity, and a second seal disposed about an interior surface of the open end, the rotor assembly also includes a second rotor arm, the rotary actuator also includes an arcuate-shaped second piston disposed in said housing for reciprocal movement in the second arcuate chamber, wherein the second seal, the second cavity, and the second piston define a second pressure chamber, and a second connector coupling a first end of the second piston to the second rotor arm. For example, the actuator 100 includes the components of the pressure chamber assembly 300 and the rotary piston assembly 200 included in the actuation section 110.

In some embodiments, the second piston can be oriented in the same rotational direction as the first piston. For example, the two pistons 260 are oriented to operate cooperatively in the same rotational direction. In some embodiments, the second piston can be oriented in the opposite rotational direction as the first piston. For example, the rotary pistons 250 are oriented to operate in the opposite rotational direction relative to the rotary pistons 260.

In some embodiments, the actuator can include a second housing and disposed about the first housing and having a second fluid port, wherein the first housing, the second housing, the seal, and the first piston define a second pressure chamber. For example, the actuator 400 includes the outer housing 450 that substantially surrounds the pressure chamber assembly 420. Pressurized fluid in the bore 452 is separated from fluid in the pressure chambers 422 by the seals 426.

In some implementations, rotating the rotary output shaft in a second direction opposite that of the first direction can include applying pressurized fluid to the second pressure chamber, and urging the second piston partially outward from the second pressure chamber to urge rotation of the rotary output shaft in a second direction opposite from the first direction. For example, pressurized fluid can be applied to the pressure chambers 310 of the first actuation section 110 to urge the rotary pistons 260 outward, causing the rotor shaft 210 to rotate counter-clockwise.

In some implementations, rotating the rotary output shaft in a second direction opposite that of the first direction can include applying pressurized fluid to the second pressure chamber, and urging the first piston partially into the first pressure chamber to urge rotation of the rotary output shaft in a second direction opposite from the first direction. For example, pressurized fluid can be flowed into the bore 452 at a pressure higher than that of fluid in the pressure chambers 422, causing the rotary pistons 414 to move into the pressure chambers 422 and cause the rotor shaft 412 to rotate counter-clockwise.

In some implementations, rotation of the rotary output shaft can urge rotation of the housing. For example, the rotary output shaft 412 can be held rotationally stationary and the housing 450 can be allowed to rotate, and application of pressurized fluid in the pressure chambers 422 can urge the rotary pistons 414 out of the pressure chambers 422, causing the housing 450 to rotate about the rotary output shaft 412.

FIGS. 26-28 show various views of the components of another example rotary piston-type actuator 2600. In general, the actuator 2600 is similar to the example actuator 100 of FIG. 1, except for the configuration of the seal assemblies. Whereas the seal assembly 320 in the example actuator 100 remains substantially stationary relative to the pressure chamber 310 and is in sliding contact with the surface of the rotary piston 250, in the example actuator 2600, the seal configuration is comparatively reversed as will be described below.

Referring to FIG. 26, a perspective view of the example rotary piston-type actuator 2600 is shown. The actuator 2600 includes a rotary piston assembly 2700 and a pressure chamber assembly 2602. The actuator 2600 includes a first actuation section 2610 and a second actuation section 2620. In the example of actuator 2600, the first actuation section 2610 is configured to rotate the rotary piston assembly 2700 in a first direction, e.g., counter-clockwise, and the second actuation section 2620 is configured to rotate the rotary piston assembly 2700 in a second direction substantially opposite the first direction, e.g., clockwise.

Referring now to FIG. 27, a perspective view of the example rotary piston assembly 2700 is shown apart from the pressure chamber assembly 2602. The rotary piston assembly 2700 includes a rotor shaft 2710. A plurality of rotor arms 2712 extend radially from the rotor shaft 2710, the distal end of each rotor arm 2712 including a bore (not shown) substantially aligned with the axis of the rotor shaft 2710 and sized to accommodate one of a collection of connector pins 2714.

As shown in FIG. 27, the first actuation section 2710 of example rotary piston assembly 2700 includes a pair of rotary pistons 2750, and the second actuation section 2720 includes a pair of rotary pistons 2760. While the example actuator 2600 includes two pairs of the rotary pistons 2750, 2760, other embodiments can include greater and/or lesser numbers of cooperative and opposing rotary pistons.

In the example rotary piston assembly shown in FIG. 27, each of the rotary pistons 2750, 2760 includes a piston end 2752 and one or more connector arms 2754. The piston end 252 is formed to have a generally semi-circular body having a substantially smooth surface. Each of the connector arms 2754 includes a bore 2756 substantially aligned with the axis of the semi-circular body of the piston end 2752 and sized to accommodate one of the connector pins 2714.

In some implementations, each of the rotary pistons 2750, 2760 includes a seal assembly 2780 disposed about the outer periphery of the piston ends 2752. In some implementations, the seal assembly 2780 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 2600 may be reduced by using a standard, e.g., commercially available, semi-circular, unidirectional seal designs generally used in linear hydraulic actuators. In some embodiments, the seal assembly 2780 can be a one-piece seal.

FIG. 28 is a perspective cross-sectional view of the example rotary piston-type actuator 2600. The illustrated example shows the rotary pistons 2760 inserted into a corresponding pressure chamber 2810 formed as an arcuate cavity in the pressure chamber assembly 2602. The rotary pistons 2750 are also inserted into corresponding pressure chambers 2810, not visible in this view.

In the example actuator 2600, when the rotary pistons 2750, 2760 are each inserted through an open end 2830 of each pressure chamber 2810, each seal assembly 2780 contacts the outer periphery of the piston end 2760 and the substantially smooth interior surface of the pressure chamber 2810 to form a substantially pressure-sealed region within the pressure chamber 2810.

In some embodiments, the seal 2780 can act as a bearing. For example, the seal 2780 may provide support for the piston 2750, 2760 as it moves in and out of the pressure chamber 310.

Figure 29A:
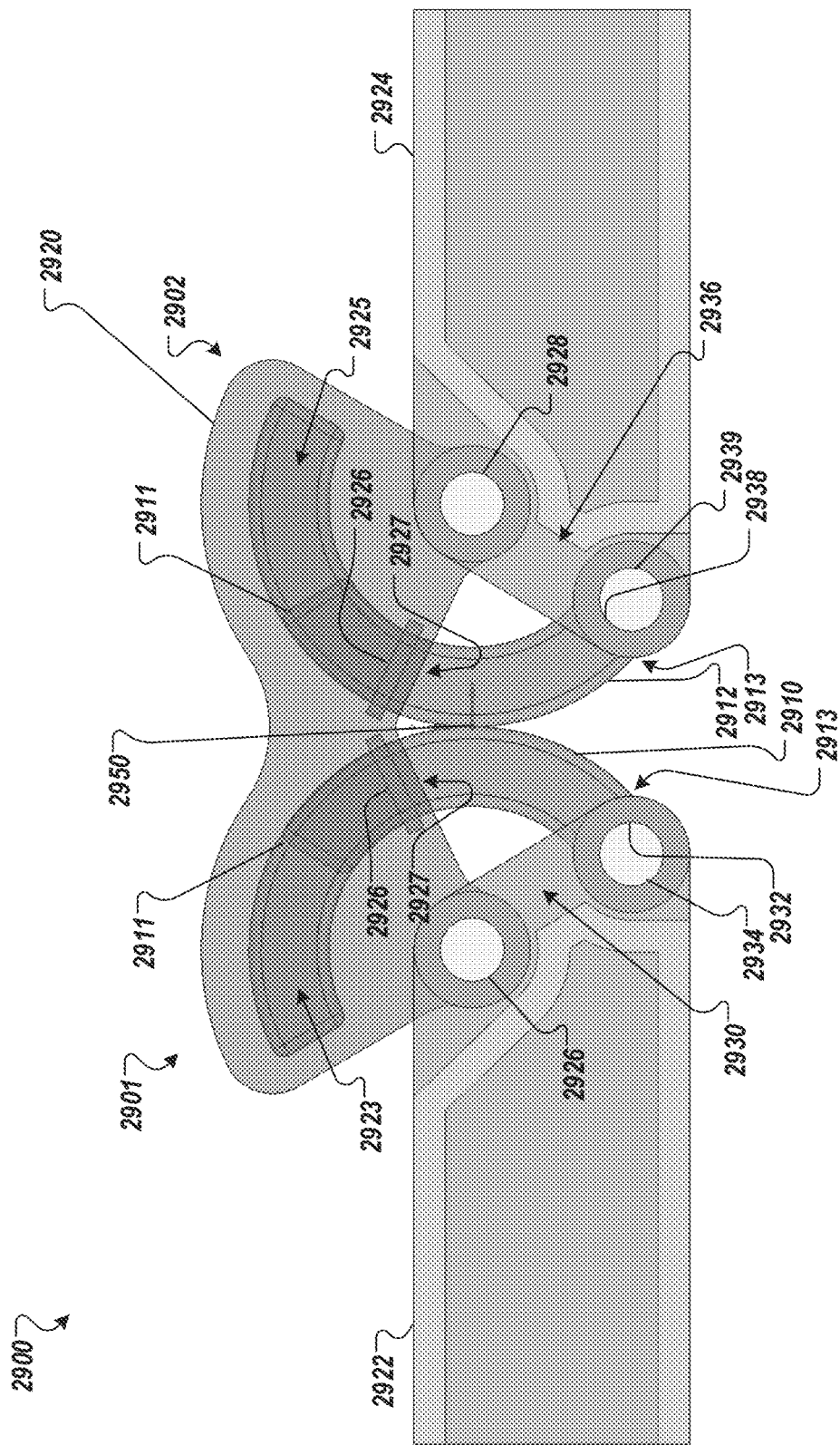
FIG. 29A is a cross-sectional view of an example butterfly rotary piston acutator.

FIG. 29A is a cross-sectional view of an example butterfly rotary piston actuator 2900. FIG. 29B is a perspective view of the example butterfly rotary piston actuator 2900. The actuator 2900 differs from the example actuators 100, 400, 800, 1100, 1200, 1500, 1700, 1900, 2200, and 2300 in that the actuator 2900 includes two rotary pistons that are in bearing contact with each other. In general, the amount of torque that can be provided by rotary piston assembles can vary along the assemblies' ranges of motion. For example, a rotary piston can provide an approximately maximum amount of torque near a fully retracted position, and this amount of torque can decrease as the piston is actuated toward its extended limit of travel. In some embodiments, such decreases in torque capacity can be caused by forces acting upon the piston in directions that are not aligned with the piston's arc of travel. For example, forces acting radially or longitudinally upon the piston, rather than tangent to the piston's designed path of actuation, can cause the piston to bind within its cylinder which can increase frictional forces and wear, and possibly reduce available torque. This loss of torque can be at least partly reduced by redirecting such misaligned forces by substantially balancing (e.g., neutralizing, cancelling) radial forces of one rotary cylinder by bearing the rotary cylinder against a second rotary cylinder having oppositely directed misaligned forces acting upon the second rotary cylinder. In general, two rotary pistons can touch each other directly or can arranged such that a load can be transferred from one piston to the other through an intermediate bearing, such that substantially equal but oppositely directed radial forces can be substantially cancelled out, as will be described below.

The actuator 2900 includes a first rotary actuator 2901 and a second rotary actuator 2902. The rotary actuator 2901 includes a first rotary piston 2910, and the second rotary actuator includes a second rotary piston 2912. The first rotary actuator 2901 and the second rotary actuator 2902 share a pressure chamber assembly 2920 (e.g., housing), although in some embodiments the first rotary actuator 2901 and the second rotary actuator 2902 may each have separate pressure chamber assemblies.

The pressure chamber assembly 2920 pivotably joins an arm portion 2922 to an arm portion 2924. The arm portion 2922 pivots relative to the pressure chamber assembly 2920 about a rotor axis 2926, and the arm portion 2924 pivots relative to the pressure chamber assembly 2923 about an axis 2928. A rotor arm portion 2930 extends radially from the rotor axis 2926 to a bore 2932 substantially aligned with the rotor axis 2926 and sized to accommodate a connector pin 2934. A rotor arm portion 2936 extends radially from the rotor axis 2926 to a bore 2937 substantially aligned with the rotor axis 2926 and sized to accommodate a connector pin 2939.

While the example actuator 2900 includes a pair of the rotary pistons 2910 and 2912, other embodiments can include greater and/or lesser numbers of cooperative and opposing rotary pistons. The rotary pistons 2910, 2912 in the example actuator 2900 of FIGS. 29A and 29B are oriented substantially opposite each other in opposite rotational directions. In some embodiments, the actuator 2900 can actuate the arm portion 2922 about 180 degrees total relative to the arm portion 2924.

In the example rotary piston assembly 2900, each of the rotary pistons 2910, 2912 includes a piston end 2911 and one or more connector arms 2913. The piston end 2911 is formed to have a substantially smooth surface. Each of the connector arms 2913 includes a bore aligned substantially parallel with the axis of the semi-circular arc of the corresponding rotary piston 2910, 2912, and sized to accommodate the connector pins 2934, 2939.

Each of the rotary pistons 2910, 2912 of the example assembly of FIGS. 29A and 29B may be assembled to the rotor arm portions 2930, 2936 by aligning the connector arms 2913 with the rotor arm portions 2930, 2936 such that the bores (not shown) of the rotor arm portions 2930, 2936 align with the bores 2932, 2938. The connector pins 2934, 2939 may then be inserted through the aligned bores to create hinged connections between the pistons 2910, 2912 and the arm portions 2922, 2924. The connector pins 2934, 2939 are slightly longer than the aligned bores. In the example actuator 2900, about the circumferential periphery of each end of the connector pins 2934, 2939 that extends beyond the aligned bores is a circumferential recess (not shown) that can accommodate a retaining fastener (not shown), e.g., a snap ring or spiral ring.

In some implementations, the one or both of the axes 2926, 2928 can be connected to an external mechanism, such as an output shaft, in order to transfer the rotary motion of the actuator 2900 to other mechanisms. An example of rotary output is discussed in the description of FIGS. 31A and 31B.

The rotary piston 2910 is inserted into a corresponding pressure chamber 2923 formed as an arcuate cavity in the pressure chamber assembly 2920. The rotary piston 2912 is inserted into a corresponding pressure chamber 2925 formed as an arcuate cavity in the pressure chamber assembly 2920.

In the example actuator 2900, each of the pressure chambers 2923, 2925 includes a seal assembly 2929 about the interior surface of the pressure chambers 2923, 2925 at an open end 2927. In some implementations, the seal assemblies 2929 can be a circular or semi-circular sealing geometry retained on all sides in a standard seal groove. In some implementations, commercially available reciprocating piston or cylinder type seals can be used. For example, commercially available seal types that may already be in use for linear hydraulic actuators flying on current aircraft may demonstrate sufficient capability for linear load and position holding applications. In some implementations, the sealing complexity of the actuator 2900 may be reduced by using a standard, e.g., commercially available, semi-circular, unidirectional seal designs generally used in linear hydraulic actuators. In some embodiments, the seal assemblies 2929 can each be a one-piece seal.

In some embodiments of the example actuator 2900, the seal assemblies 2929 may be included as part of the rotary pistons 2910, 2912. For example, the seal assemblies 2929 may be located near the piston ends 2911, opposite the connector arm 2913, and slide along the interior surface of the pressure chamber 2923 or 2925 to form a fluidic seal as the rotary piston 2910 or 2912 moves in and out of the corresponding pressure chamber 2923, 2925. In some embodiments, the seal assemblies 2929 can act as a bearing. For example, the seal assemblies 2929 may provide support for the pistons 2910, 2912 as they move in and out of the pressure chambers 2923, 2925.

In some embodiments, the actuator 2900 may include a wear member between the pistons 2910, 2912 and the pressure chambers 2923, 2925. For example, a wear ring may be included in proximity to one or both of the seal assemblies 2929. The wear ring may act as a pilot for the pistons 2910, 2912, and/or act as a bearing providing support for the pistons 2910, 2912.

In the example actuator 2900, when the rotary pistons 2910, 2912 are inserted through the open ends 2927, the seal assemblies 2929 contact the interior surfaces of their respective pressure chamber 2923, 2925 and the substantially smooth surface of the piston end 2911 to form a substantially pressure-sealed region within the pressure chambers 2923, 2925. Each of the pressure chambers 2923, 2925 may include a fluid port (not shown) formed through the pressure chamber assembly 2920, through which pressurized fluid may flow. Upon introduction of pressurized fluid, e.g., hydraulic oil, water, air, or gas, into the pressure chambers 2923, 2925, the pressure differential between the interior of the pressure chambers 2923, 2925 and the ambient conditions outside the pressure chambers 2923, 2925 causes the piston ends 2911 to be urged outward from the pressure chambers 2923, 2925. As the piston ends 2911 are urged outward, the pistons 2923, 2925 urge the arm portion 2922 to pivot relative to the arm portion 2924.

In use, pressurized fluid in the example actuator 2900 can be applied to the pressure chambers 2923, 2925. The fluid pressure urges the rotary piston 2910 out of the pressure chamber 2923 (e.g., clockwise in the views shown in FIGS. 29A and 29B). This fluid pressure can also urge the rotary piston 2910 radially outward, away from the axis 2926. The fluid pressure also urges the rotary piston 2912 out of the pressure chamber 2925 (e.g., counter-clockwise in the views shown in FIGS. 29A and 29B). This fluid pressure can also urge the rotary piston 2912 radially outward, away from the axis 2928. The rotary piston 2910 is in bearing contact with the rotary piston 2912 at a contact point 2950. In the illustrated examples, the rotary piston 2910 directly contacts the rotary piston 2912. In some embodiments, the rotary piston 2910 can bear against the rotary piston 2912 indirectly through an intermediate bearing (e.g., a sliding bearing surface, or one or more intermediate roller bearings). As such, the radially outward force of the rotary piston 2910 is substantially cancelled by the radially outward force of the rotary piston 2912 through the contact point 2950 or an intermediate bearing. For example, the rotary piston 2910 can actuated in the same rotational direction as the rotary piston 2912, or the rotary piston 2912 can be oriented in the opposite rotational direction as the rotary piston 2910. In these and other examples, a roller bearing or a collection of roller bearings can be used to transmit radial forces between the rotary pistons 2910, 2912 while also providing a rolling, rather than sliding, bearing contact between the two rotary pistons 2910, 2912.

In some embodiments, motion of the rotary pistons 2910 and 2912 can be actively coordinated. For example, a first position module (e.g., a rotary encoder, a position sensor) can be configured to determine a first rotational position of the rotary piston 2910, a second position module can be configured to determine a second rotational position of the rotary piston 2912, and a control module can be configured to control fluid pressures in the pressure chamber 2923 and in the pressure chamber 2925 based on the first positon and the second position, and coordinate reciprocal movement of the rotary piston 2910 with reciprocal movement of the rotary piston 2912. In another example, the position modules can be pressure, flow, or volumetric sensors that can sense the pressure, flow, or volume of fluid in the pressure chambers 2923, 2925, and estimate the first position and/or second position based on the sensed pressure, flow, or volume. In some embodiments, motion of the rotary pistons 2910 and 2912 can be passively coordinated. Examples of passive coordination are discussed further in the descriptions of FIGS. 30A, 30B, and 32.

In some embodiments of the example actuator 2900, the pressure chamber assembly 2920 can be formed from a single, unitary piece of material. For example, the pressure chambers 122 and the openings 126 may be formed by molding, machining, or otherwise forming a unitary piece of material to form pressure chambers having no additional seams.

In some embodiments of the example actuator 2900, the pressure chamber assembly 2920 can include two separable pressure chamber sub-assemblies. For example, the pressure chamber 2923 can be formed in a first pressure chamber sub-assembly, the pressure chamber 2925 can be formed in a second pressure chamber sub-assembly, and the two pressure chamber sub-assemblies can be affixed to each other, either directly or indirectly (e.g., through an intermediate fixture apparatus). In some examples, the pressure chamber sub-assemblies can each be formed from a unitary, single piece of material to form pressure chambers having no additional seams.

Figure 30A:
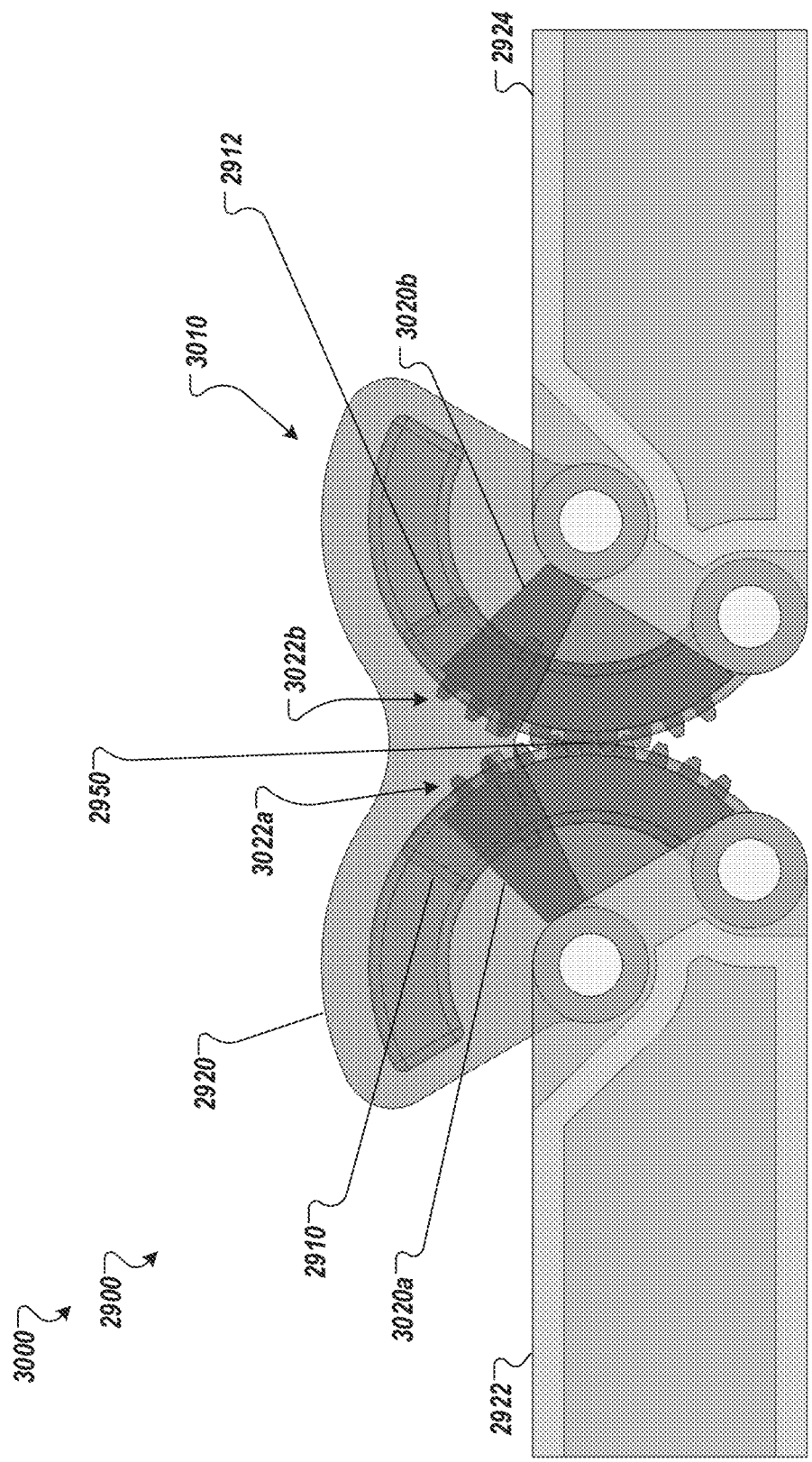
FIG. 30A is a cross-sectional view of an example butterfly rotary piston assembly with mechanical synchronization features.
Figure 30B:
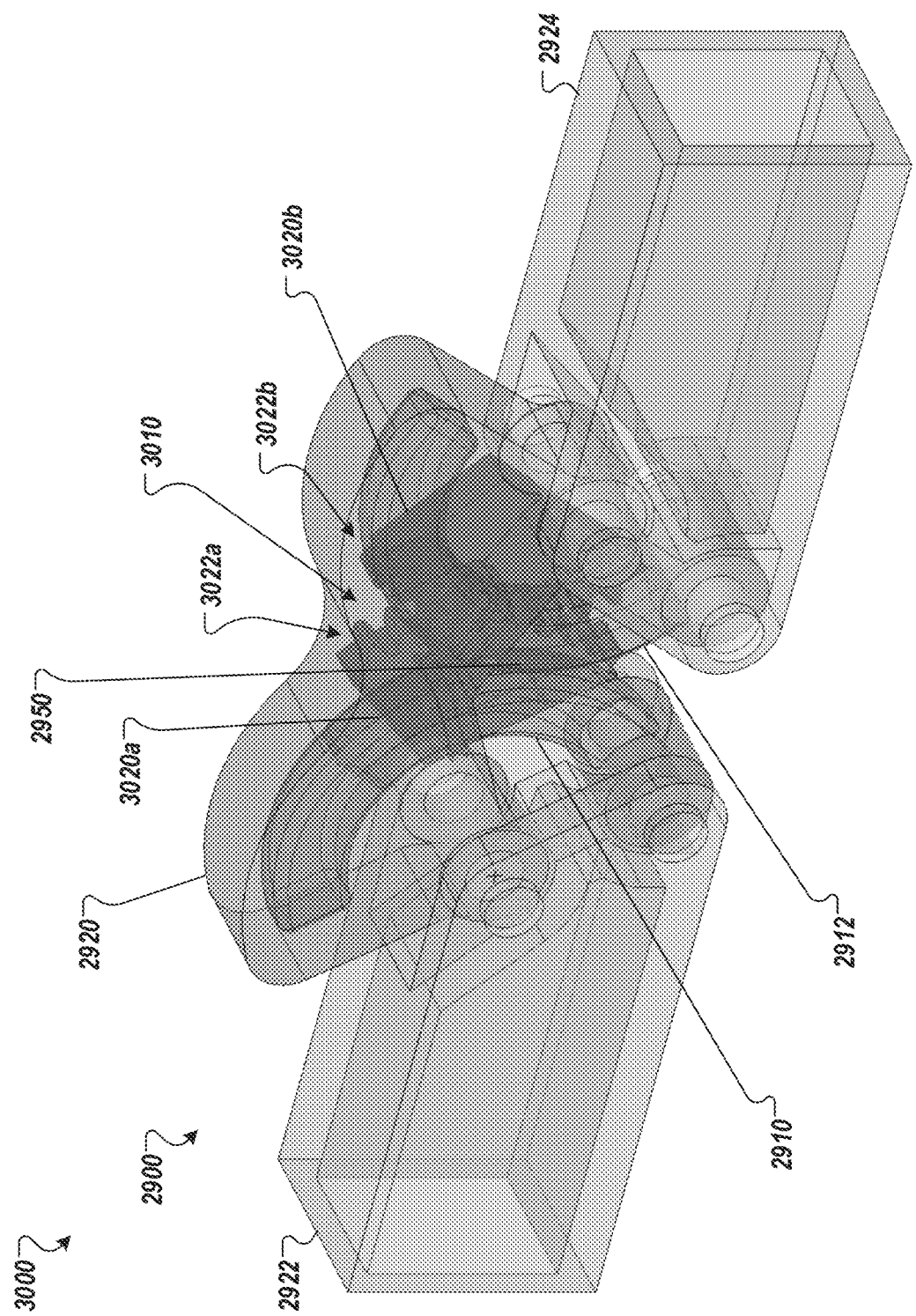
FIG. 30B is a perspective view of an example butterfly rotary piston actuator with mechanical synchronization features.
Figure 30C:
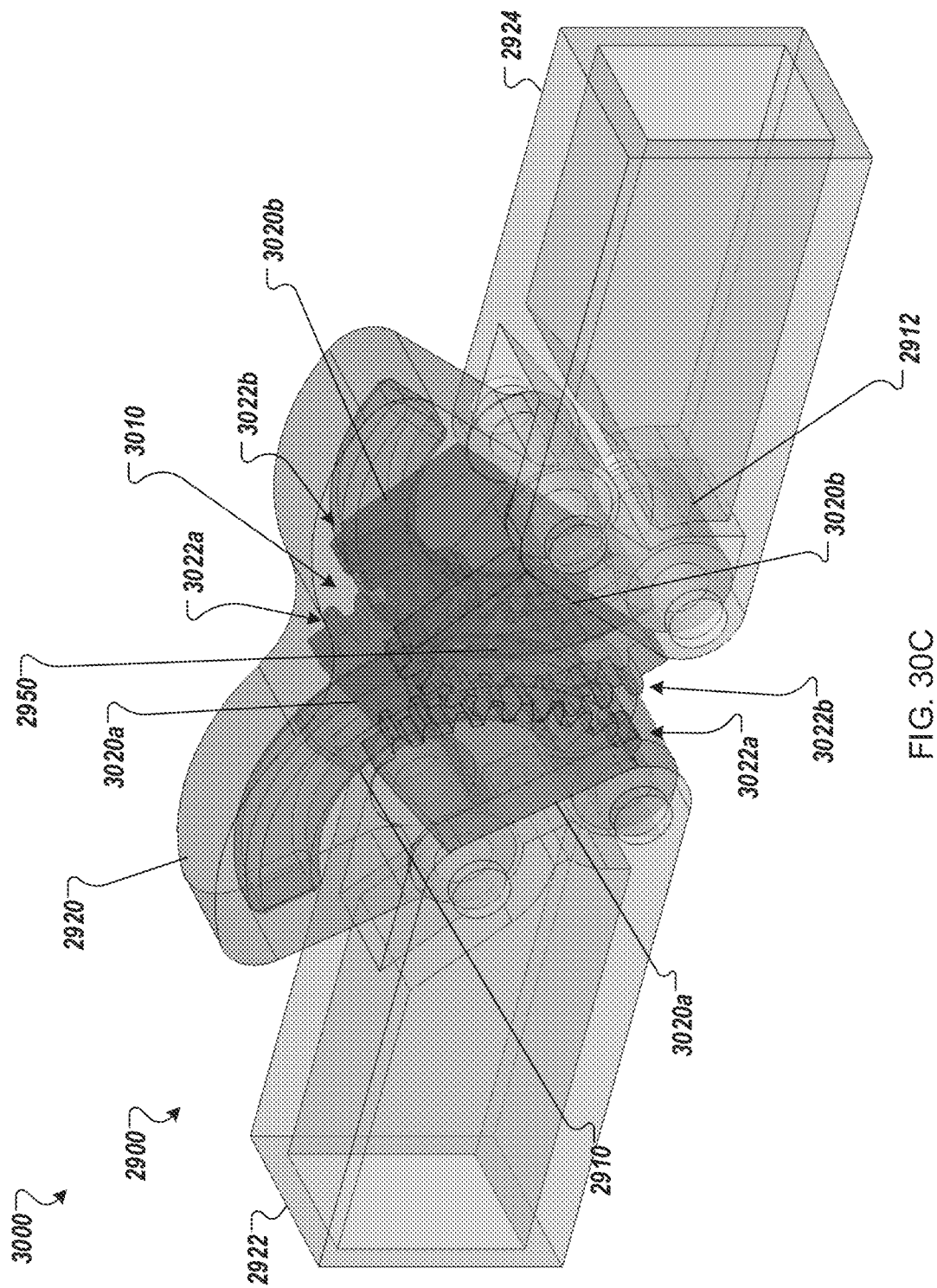
FIG. 30C is another perspective view of an example butterfly rotary piston actuator with mechanical synchronization features.

FIG. 30A is a cross-sectional view of an example butterfly rotary piston assembly 3000 with mechanical synchronization. FIG. 30B is a perspective view of the example butterfly rotary piston actuator 300 with mechanical synchronization. FIG. 30C is another perspective view of the example butterfly rotary piston actuator 3000 with mechanical synchronization. The actuator 3000 in includes the example actuator 2900 of FIGS. 29A and 29B, plus a mechanical synchronization assembly 3010.

The mechanical synchronization assembly 3010 includes a gear section 3020a and a gear section 3020b. The gear section 3020a is removably affixed to the arm portion 2922 proximal the contact point 2950, and the gear section 3020b is removably affixed to the arm portion 2924 proximal the contact point 2950.

The gear section 3020a includes a collection of gear teeth 3022a, and the gear section 3020b includes a collection of gear teeth 3022b configured to intermesh with the collection of gear teeth 3022a and coordinate reciprocal movement of the rotary piston 2910 with reciprocal movement of the rotary piston 2912. For example, as the piston 2910 extends, the arm portion 2922 pivots relative to the pressure chamber assembly 2920. The collection of gear teeth 3022a therefore also move relative to the pressure chamber assembly 2920. The collection of gear teeth 3022a intermesh with the collection of gear teeth 3022b and urge a corresponding pivotal movement of the arm portion 2924 relative to the pressure chamber 2920 and the arm portion 2922.

In some embodiments, the gear sections 3020a, 3020b may be in frictional contact. For example, instead of having intermeshed gear teeth, the gear sections 3020a, 3020b may roll against each other.

Figure 31A:
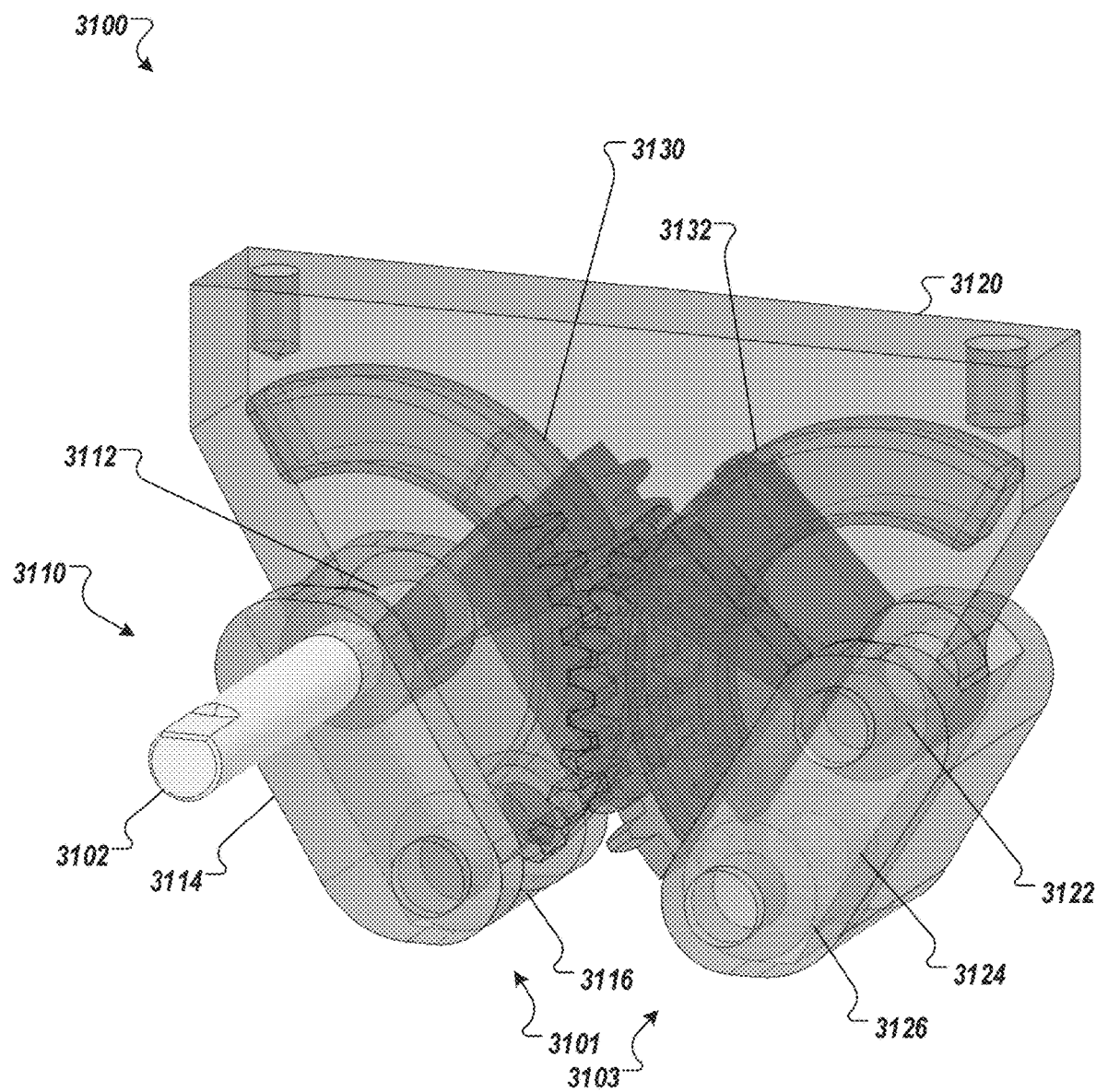
FIG. 31A is a perspective view of an example butterfly rotary piston actuator with rotary output shaft.
Figure 31B:
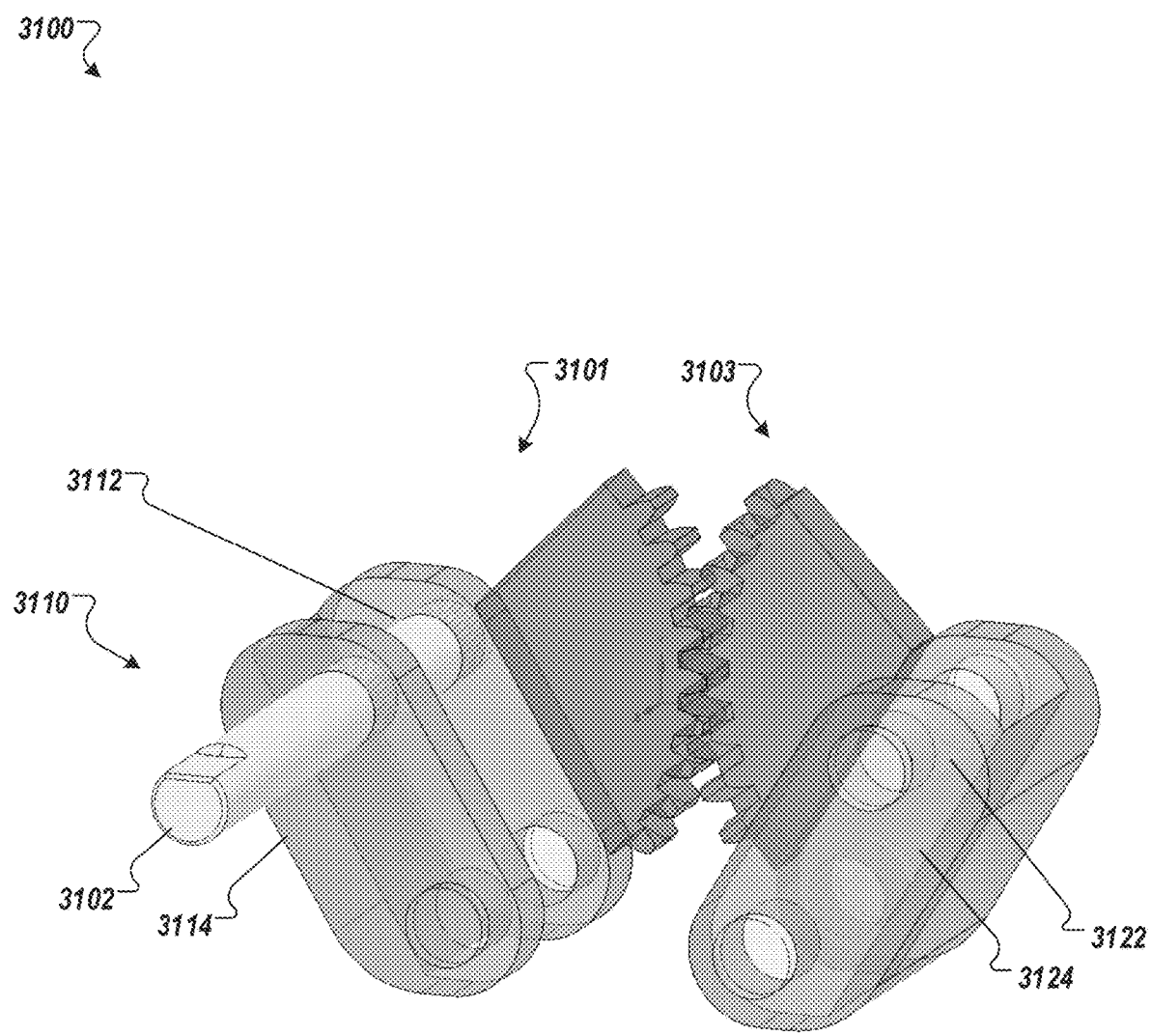
FIG. 31B is partial perspective view of an example butterfly rotary piston actuator with rotary output shaft.

FIG. 31A is a perspective view of an example butterfly rotary piston actuator 3100. FIG. 31B is partial perspective view of the example butterfly rotary piston actuator 3100. The actuator 3100 is substantially similar to the example actuator 2900 of FIGS. 21A-30C, but is adapted to provide rotary (e.g., torque) output at a rotary output shaft 3102 (e.g., instead of, or in addition to, pivotal movement of the arm portion 2922).

In the illustrated example, a rotary actuator 3101 includes a rotor assembly 3110 rotatably journaled in a pressure chamber assembly 3120 (e.g., the pressure chamber assembly 2920). The rotor assembly 3110 includes an axis shaft 3112 and a rotor arm 3114 (e.g., the rotor arm portion 2922) extending radially outward from the axis shaft 3112. A first portion 3116 (e.g., one of the connector arms 2913) of a rotary piston 3130 (e.g., the rotary piston 2910) contacts the rotor arm 3114. The rotary actuator further comprises another rotor assembly 3103 rotatably journaled in the pressure chamber assembly 3120 and includes an axis shaft 3122 and a rotor arm 3124 extending radially outward from the axis shaft 3122, wherein a first portion 3126 of a rotary piston 3132 contacts the second rotor arm 3124. The axis shaft 3112 is fixedly positioned relative to the axis shaft 3122 by the pressure chamber assembly 3120.

The rotary output shaft 3102 extends from the axis shaft 3112. The rotary output shaft 3102 is configured to be rotated by the axis shaft 3112 or by the rotor arm 3114 as the rotary piston 3130 extends and retracts relative to the pressure chamber assembly 3120.

In some embodiments, one or both of the rotor arms can include an arm portion extending from the axis shaft 3112 radially beyond the first portion 3116. For example, the rotary piston actuator 3100 can be used as an articulated joint between an excavator arm (e.g., the arm portion 2924) and an end effector or tool such as a bucket or shovel, in which the bucket can be the arm portion that extends away from the axis shaft 3112 and pivot (e.g., scoop) relative to the excavator arm affixed to the rotor assembly 3103.

Figure 32:
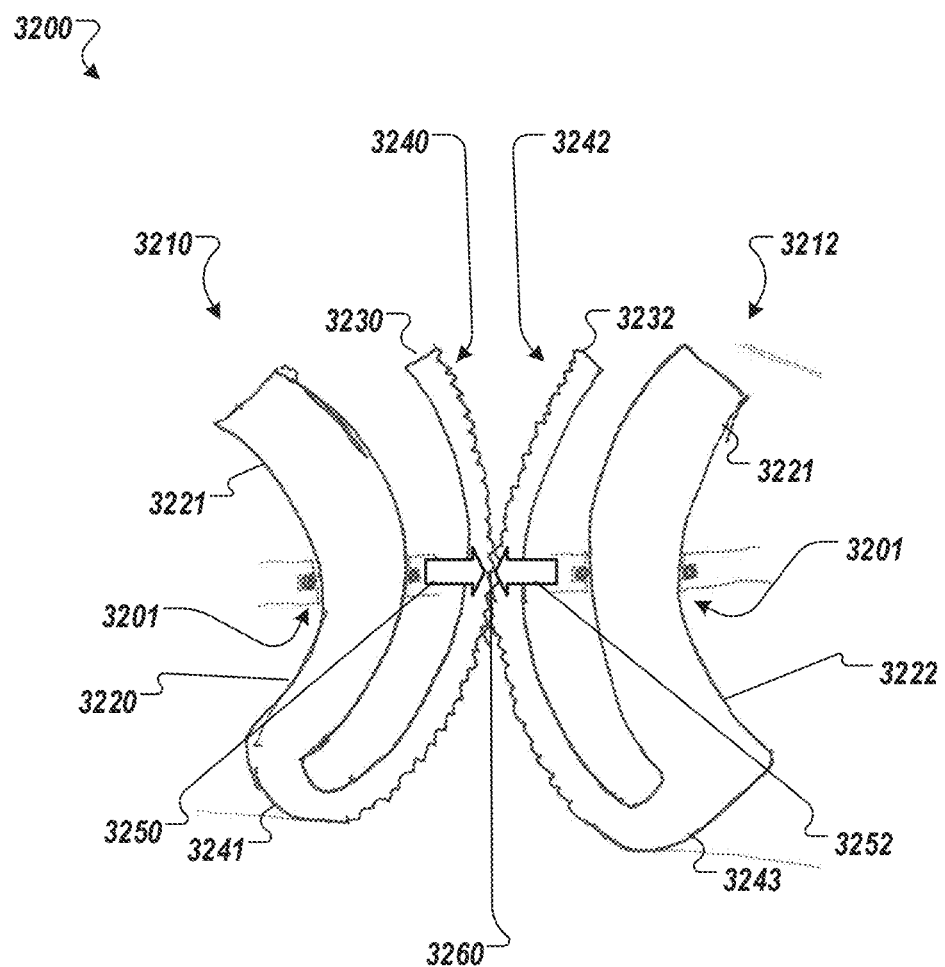
FIG. 32 is a cross-sectional side view of an example pair of rotary pistons with mechanical synchronization features.

FIG. 32 is a cross-sectional side view of an example pair 3200 of rotary piston assemblies with mechanical synchronization features. The pair 3200 includes a rotary piston assembly 3210 and a rotary piston assembly 3212. Generally speaking, the rotary piston assemblies 3210, 3212 are substantially similar to the example rotary pistons 2910, 2912 of FIGS. 29A-31A. but have been modified with the addition of gear portions that intermesh (e.g., to provide mechanical synchronization between the pistons) and bear against each other (e.g., to transmit substantially offsetting radial forces). In some embodiments, the piston assemblies 3210, 3212 can be used with slightly modified versions of the example butterfly rotary piston actuators 2900, 3000, and/or 3101 of FIGS. 29A-31B.

The rotary piston assemblies 3210, 3212 are oriented substantially opposite each other in opposite rotational directions. The rotary piston assembly 3210 includes a rotary piston 3220, and the rotary piston assembly 3212 includes a rotary piston 3222. Each of the rotary pistons 3220 and 3222 is curved, and includes a piston end 3221 that is formed to have a substantially smooth surface. In use, the piston ends 3221 are inserted into corresponding arcuate pressure chambers (not shown but, e.g., similar to the pressure chambers 2923, 2925 of FIGS. 29A-29B) through an open end 3201 of the pressure chambers.

The rotary piston assembly 3210 includes a gear section 3230, and the rotary piston assembly 3212 includes a gear section 3232. The gear section 3230 includes a collection of gear teeth 3240 extending from a distal end 3241 of the rotary piston 3220, and the gear section 3232 includes a collection of gear teeth 3242 extending from a distal end 3243 of the rotary piston 3222. The collection of gear teeth 3242 is configured to intermesh with the collection of gear teeth 3240 and coordinate reciprocal movement of the rotary piston 3220 with reciprocal movement of the rotary piston 3222. For example, as the piston 3220 extends, the gear section 3230 pivots relative to the pressure chamber assembly (not shown). The collection of gear teeth 3240 therefore also move relative to the pressure chamber assembly. The collection of gear teeth 3240 intermesh with the collection of gear teeth 3242 and urge a corresponding pivotal movement of the gear section 3232 and the rest of the rotary piston assembly 3212 relative to the pressure chamber.

In some embodiments, the gear sections 3230, 3232 may be in frictional contact. For example, instead of having intermeshed gear teeth, the gear sections 3240, 3242 may roll against each other.

A radial force, directed outward relative to the radius of curvature of the rotary piston 3220 and represented by arrow 3250, is exhibited by the rotary piston 3220. A radial force, directed outward relative to the radius of curvature of the rotary piston 3222 and represented by arrow 3252, is exhibited by the rotary piston 3222. The radial force 3252 is substantially equal to in magnitude and substantially opposite in direction to the radial force 3250. The radial force 3250 and the radial force 3252 are directed into each other at a contact point 3260 where the gear sections 3230, 3232 meet. As such, the radial force 3250 and the radial force 3252 substantially offset or cancel each other.

Figure 33:
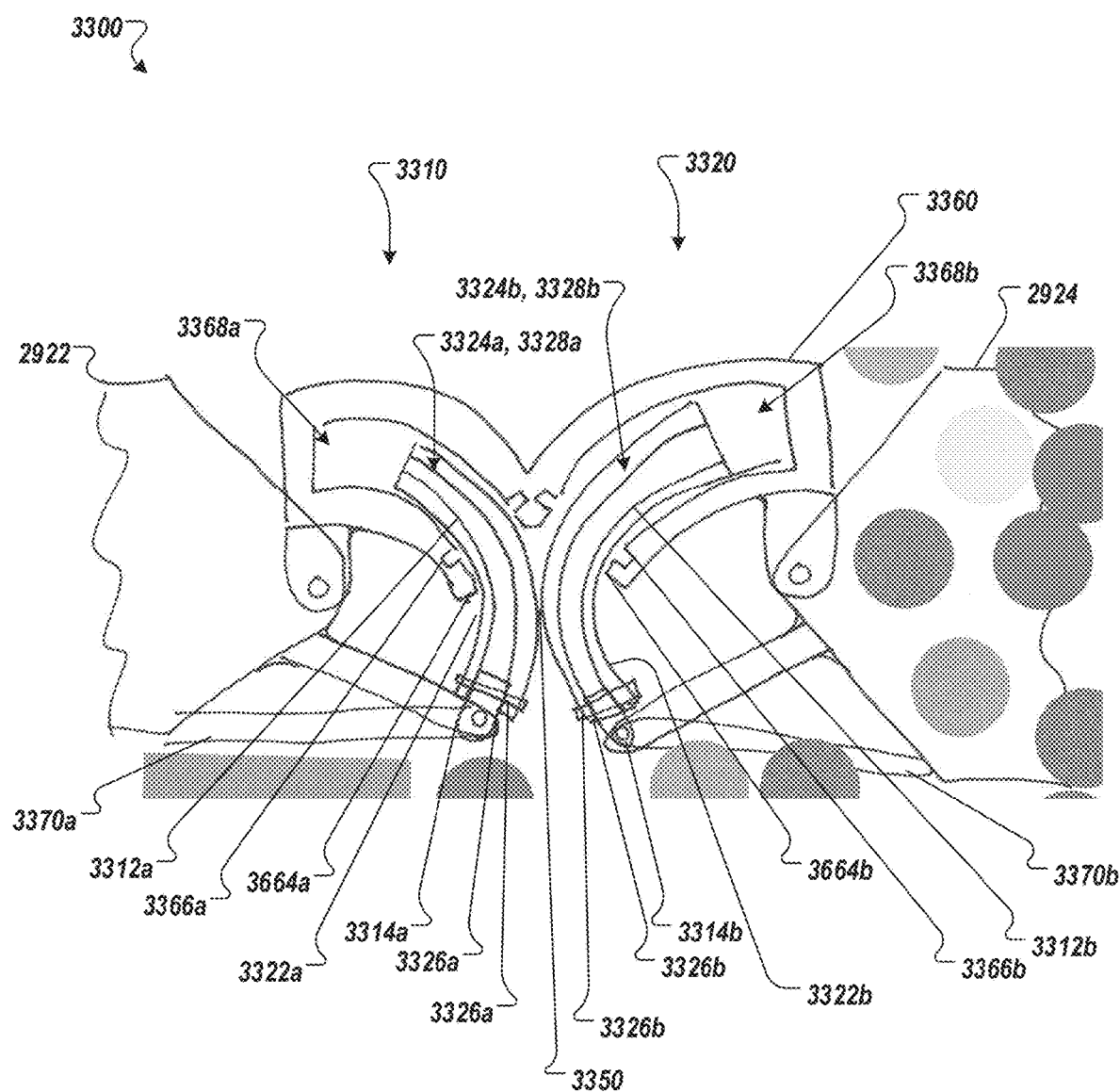
FIG. 33 is a cross-sectional side view of an example butterfly rotary piston actuator with multi-chamber pistons.

FIG. 33 is a cross-sectional side view of an example butterfly rotary piston actuator 3300. The actuator 3300 is substantially similar to the example actuator 2900 of FIGS. 21A-30C, but substitutes the rotary pistons 2910, 2912 with a multi-chamber rotary piston 3320 and a multi-chamber rotary piston 3322.

In general, the butterfly rotary piston actuator 3300 is configured as an RPA-within-an-RPA. In general, an RPA can be configured to have a piston that is hollow so as to act as a pressure chamber for a second piston within the hollow piston. In such an example, the hollow piston separates two independent pressure chambers that can be actuated individually, for example to provide two different torques, or to provide coarse and fine positioning control.

The actuator 3300 includes a piston assembly 3310, a piston assembly 3320, and a pressure chamber assembly 3360 (e.g., a housing). The pressure chamber assembly 3360 defines a chamber comprising a cavity 3362a, a first fluid port (not shown) in fluid communication with the cavity 3362a, and an open end 3364a. The pressure chamber assembly 3660 also defines a chamber comprising a cavity 3362b, a fluid port (not shown) in fluid communication with the cavity 3662b, and an open end 3664b.

The piston assembly 3310 includes a tubular piston 3322a. The tubular piston 3322a defines a chamber comprising a cavity 3324a and an open end 3326a. A fluid port (not shown) is in fluid communication with the cavity 3324a. The tubular piston 3322a is disposed in the pressure chamber assembly 3360 for reciprocal movement in the chamber 3362a through the open end 3364a. A seal 3366a, the cavity 3324a, and the piston 3322a define a pressure chamber 3368a.

The piston assembly 3320 includes a tubular piston 3322b. The tubular piston 3322b defines a chamber comprising a cavity 3324b and an open end 3326b. A fluid port (not shown) is in fluid communication with the cavity 3324b. The tubular piston 3322b is disposed in the pressure chamber assembly 3360 for reciprocal movement in the chamber 3362b through the open end 3364b. A seal 3366b, the cavity 3324b, and the piston 3322b define a pressure chamber 3368b.

The piston assembly 3310 includes a piston 3312a disposed in the piston assembly 3320 for reciprocal movement in the chamber 3368a through the open end 3364a. A seal 3326a, the cavity 3324a, and the piston 3312a define a pressure chamber 3328a. A portion 3314a of the piston 3312a contacts a rotor arm portion 3370a linked to the arm portion 2922.

The piston assembly 3310 includes a piston 3312b disposed in the piston assembly 3320 for reciprocal movement in the chamber 3368b through the open end 3364b. A seal 3326b, the cavity 3324b, and the piston 3312b define a pressure chamber 3328b. A portion 3314b of the piston 3312b contacts a rotor arm portion 3370b linked to the arm portion 2924.

In the example of the actuator 3300, the pressure chambers 3328a, 3328b, 3368a, and 3368b are substantially sealed from each other and can be pressurized individually. For example, a fluid pressure may be applied to the pressure chamber 3328a and a different fluid pressure may be applied to the pressure chamber 3328b.

In the example of the actuator 3300, the pressure chamber 3328a is configured to rotate the rotary piston assembly 3310 in a first direction, e.g., clockwise, and the pressure chamber 3328b is configured to rotate the rotary piston assembly 3310 in a second direction substantially opposite the first direction, e.g., counter-clockwise.

The rotary piston 3322a is in bearing contact with the rotary piston 3322b at a contact point 3350. In the illustrated examples, the rotary piston 3322a directly contacts the rotary piston 3322b. In some embodiments, the rotary piston 3322a can bear against the rotary piston 3322b indirectly through an intermediate bearing (e.g., a sliding bearing surface, or one or more intermediate roller bearings). As such, the radially outward force of the rotary piston 3322a is substantially cancelled by the radially outward force of the rotary piston 3322b through the contact point 3350 or an intermediate bearing.

Figure 34:
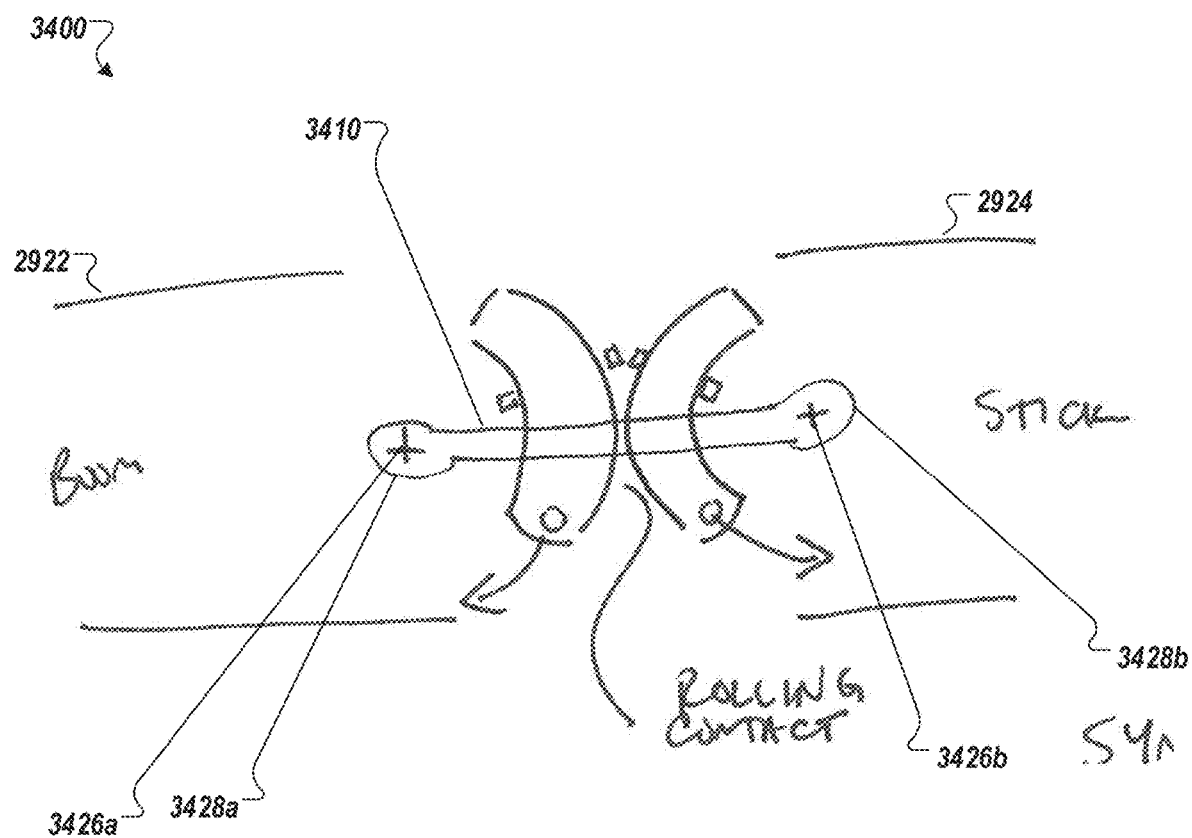
FIG. 34 is a cross-sectional side view of another example butterfly rotary piston actuator.

FIG. 34 is a cross-sectional side view of another example butterfly rotary piston actuator 3400. The actuator 3400 is substantially similar to the example actuator 2900 of FIGS. 21A-30C, but includes a linkage fixture 3410. The linkage fixture 3410 fixedly position an axis 3426a and an axis shaft 3428a of a first rotary piston actuator 3410 relative to a second axis 3426b and a second axis shaft 3428b of a second rotary piston actuator 3412.

Figure 35:
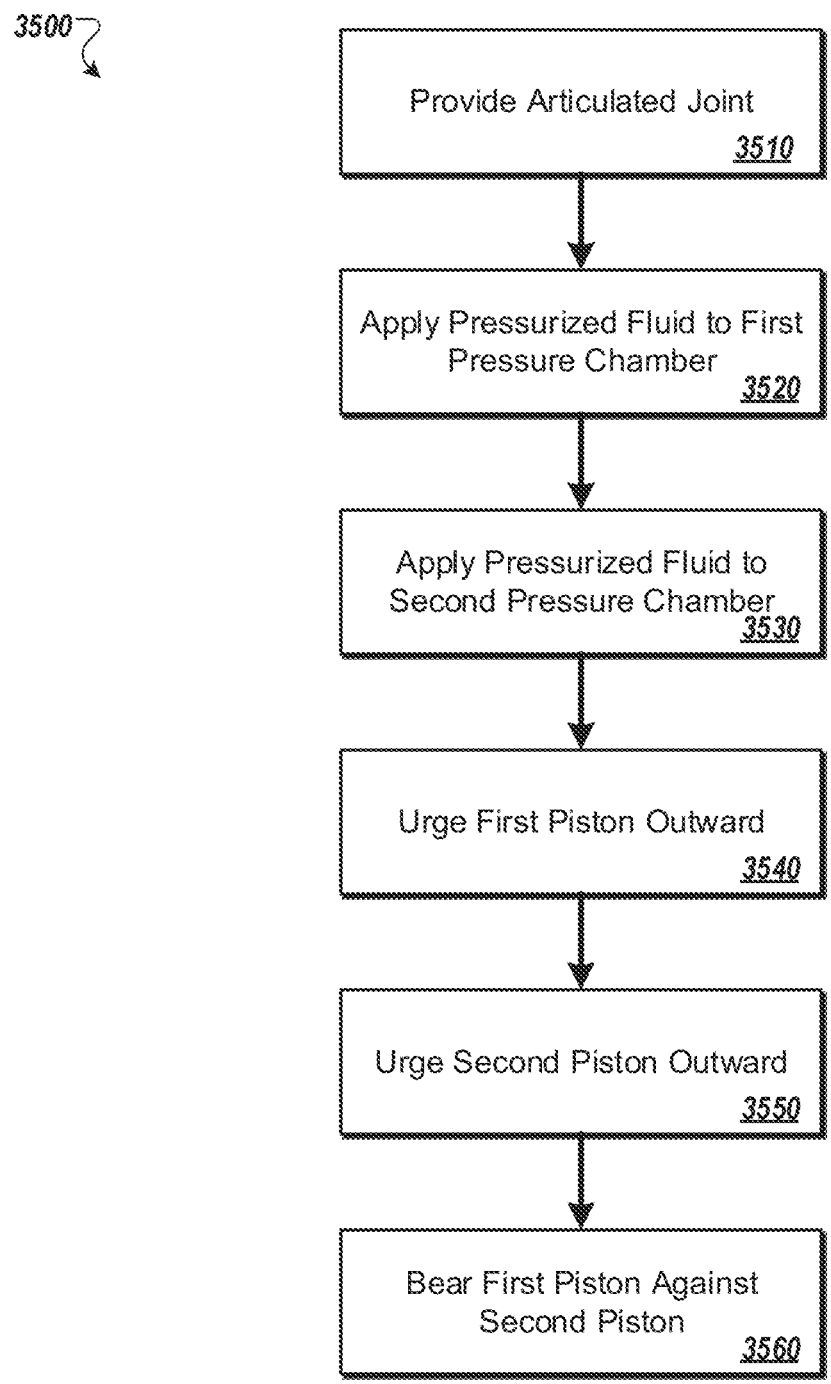
FIG. 35 is a flow diagram of an example process for actuating a butterfly rotary piston actuator.

FIG. 35 is a flow diagram of an example process 3500 for actuating a butterfly rotary piston actuator. In some implementations, the process 3500 can be used with any of the example butterfly rotary piston actuators 2900, 3000, 3100, 3200, 3300, or 3400 of FIGS. 29A-34.

At 3510 an articulated joint is provided. The articulated joint includes a first rotary actuator having a first housing defining a first arcuate chamber having a first cavity and a first open end, and an arcuate-shaped first piston having a first radius of curvature and disposed in said first housing for reciprocal movement in the first arcuate chamber through the first open end and in a first plane about a first axis, wherein a first seal, the first cavity, and the first piston define a first pressure chamber. The articulated joint also includes a second rotary actuator having a second housing defining a second arcuate chamber having a second cavity and a second open end, and an arcuate-shaped second piston having a second radius of curvature and disposed in said second housing for reciprocal movement in the second arcuate chamber through the second open end and in a second plane substantially parallel to the first plane about a second axis, wherein a second seal, the second cavity, and the second piston define a second pressure chamber. A first radial side of the first piston relative to the first radius of curvature is in bearing contact with a first radial side of the second piston relative to the second radius of curvature at a contact point between the first axis and the second axis. For example, any of the example butterfly rotary piston actuators 2900, 3000, 3100, 3200, 3300, or 3400 may be provided.

At 3520, a pressurized fluid is applied to the first pressure chamber. For example, hydraulic fluid can be pumped into the pressure chamber 2923.

At 3530 a pressurized fluid is applied to the second pressure chamber. For example, hydraulic fluid can be pumped into the pressure chamber 2925.

At 3540, the first piston is urged partially outward from the first pressure chamber in a first rotational direction. For example, pressure from the hydraulic fluid in the pressure chamber 2923 can push the rotary piston 2910 partly outward from the pressure chamber 2923 in a clockwise direction (as viewed in FIG. 29A).

At 3550, the second piston is urged partially outward from the second pressure chamber in a second rotational direction opposite the first rotational direction. For example, pressure from the hydraulic fluid in the pressure chamber 2925 can push the rotary piston 2912 partly outward from the pressure chamber 2925 in a counter-clockwise direction (as viewed in FIG. 29A).

At 3560, the first piston can bear against the second piston. For example, the rotary piston 2910 contacts the rotary piston 2912 at the contact point 2950, or through an intermediate bearing member.

The method of claim 18, wherein bearing the first piston against the second piston further comprises contacting a first radial side of the first piston relative to the first radius of curvature to a first radial side of the second piston relative to the second radius of curvature at a contact point between the first axis and the second axis.

In some implementations, the articulated joint also includes a bearing member. For example, the rotary piston 2910 can be in indirect contact with the rotary piston 2912 through an intermediate bearing member (e.g., sliding bearing, roller bearing). In some implementations, bearing the first piston against the second piston further includes contacting the bearing member to the first radial side of the first piston, and contacting the bearing member to the first radial side of the second piston, such that the first radial side of the second piston is in indirect contact with the first radial side of the first piston through the bearing member.

In some implementations, urging the first piston partially outward from the first pressure chamber in the first rotational direction can include urging, by a first radial force having a first magnitude in a first radial direction, the first piston radially outward, and urging the second piston partially outward from the second pressure chamber in the second rotational direction can include urging, by a second radial force having a second magnitude substantially equal to the first magnitude and a second radial direction substantially opposite the first radial direction, the second piston radially outward, and bearing the first piston against the second piston can include applying, by the first piston, the first radial force to the first radial side of the second piston, and applying, by the second piston, the second radial force to the first radial side of the first piston. For example, as the rotary pistons 2910 and 2912 extend, the rotary pistons 2910 and 2912 can both exhibit respectively outward radial forces or motions. The outward force or motion of the rotary piston 2910 can be at least partly countered by biasing the rotary piston 2910 against the rotary piston 2912, allowing the oppositely-directed, radially outward forces or motion of the rotary piston 2912 to at least partly oppose the radially outward forces or motion of the rotary piston 2910.

In some implementations, the first radial side of the first piston can be a radially outer side of the first piston, and the first radial side of the second piston can be a radially outer side of the second piston. For example, the radially outer side of the rotary piston 2910 contacts the radially outer side of the rotary piston 2912.

In some implementations, the process 3500 can also include affixing the first housing to the second housing. For example, the first rotary actuator 2901 and the second rotary actuator 2902 may each have their own pressure chamber assembly, e.g., instead of sharing the single pressure chamber assembly 2920. Such separate pressure chamber assemblies can then be affixed to each other or fixedly positioned relative to each other through an intermediate fixture (e.g., jig) or housing.

In some implementations, the process 3500 can include rotating a rotary output shaft extending from a selected one of a first axis shaft of the first rotary actuator and a second axis shaft of the second rotary actuator. For example, the example butterfly rotary piston actuator 3100 includes the rotary output shaft 3102 that can extend from the axis shaft 3112.

In some implementations, the process 3500 can include actuating an arm portion extending from first axis shaft. For example, the rotor arm 3114 extends from the axis shaft 3112 to the first portion 3116 of the rotary piston 3130.

In some implementations, the first rotary actuator can include a first gear section having first gear teeth, and the second rotary actuator can include a second gear section having second gear teeth, and the process 3500 can include intermeshing the first gear teeth with the second gear teeth, urging, by movement of the first piston, movement of the first gear section relative to the second gear section, and urging, by the relative movement of the first gear section relative to the second gear section, coordinated reciprocal movement of the second piston with reciprocal movement of the first piston. For example, the mechanical synchronization assembly 3010 includes the collections of gear teeth 3022a, 3022b which contact and intermesh to coordinate movement of the rotary piston 2910 and the rotary piston 2912 as the rotary pistons 2910, 2912 reciprocate within their respective pressure chambers.

In some implementations, the process 3500 can include determining a first rotational position signal representative of the reciprocal movement of the first piston, determining a second rotational position signal representative of the reciprocal movement of the second piston, controlling a first fluid pressure in the first pressure chamber and a second fluid pressure in the second pressure chamber based on the first positon and the second position, and coordinating reciprocal movement of the first piston with reciprocal movement of the second piston based on the first fluid pressure and the second fluid pressure. For example, the rotational positions of the rotary pistons 2910, 2912 can be measured directly (e.g., with a rotary encoder or other such positional sensor) or indirectly (e.g., position can be estimated as a function of fluid pressure, flow, or volume, or such as by using accelerometers on the pistons).

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An articulated joint comprising:
a first rotary actuator comprising:
a first housing defining a first arcuate chamber comprising a first cavity and a first open end; and
an arcuate-shaped first piston having a first radius of curvature and disposed in said first housing for reciprocal movement in the first arcuate chamber through the first open end and in a first plane about a first axis;
a second rotary actuator comprising:
a second housing defining a second arcuate chamber comprising a second cavity and a second open end; and
an arcuate-shaped second piston having a second radius of curvature and disposed in said second housing for reciprocal movement in the second arcuate chamber through the second open end and in a second plane substantially parallel to the first plane about a second axis;
wherein a first radial side of the first piston relative to the first radius of curvature is in bearing contact with a first radial side of the second piston relative to the second radius of curvature at a contact point between the first axis and the second axis.

2. The articulated joint of claim 1, wherein the first radial side of the first piston is in direct contact with the first radial side of the second piston.

3. The articulated joint of claim 1, further comprising a bearing member in bearing contact with the first radial side of the first piston and the first radial side of the second piston, wherein the first radial side of the first piston is in indirect contact with the first radial side of the second piston through the bearing member.

4. The articulated joint of claim 1, wherein the first radial side of the first piston is a radially outer side of the first piston, and the first radial side of the second piston is a radially outer side of the second piston.

5. The articulated joint of claim 1, wherein the first housing is affixed to the second housing.

6. The articulated joint of claim 1, wherein the second piston is oriented in the same rotational direction as the first piston.

7. The articulated joint of claim 1, wherein the second piston is oriented in the opposite rotational direction as the first piston.

8. The articulated joint of claim 7, wherein:
the first piston is configured to rotate about the first axis in a first rotational direction while entering the first cavity and rotate about the first axis in a second rotational direction opposite the first rotational direction while exiting the first cavity;
the second piston is configured to rotate about the second axis in the second rotational direction while entering the second cavity and rotate about the second axis in the first rotational direction while exiting the second cavity.

9. The articulated joint of claim 1, wherein:
the first rotary actuator further comprises a first rotor assembly rotatably journaled in said first housing and comprising an axis shaft and a rotor arm extending radially outward from the axis shaft, wherein a first portion of the first piston contacts the rotor arm.

10. The articulated joint of claim 9, further comprising a rotary output shaft extending from the axis shaft and configured to be rotated by the axis shaft.

11. The articulated joint of claim 9, wherein the first rotor arm further comprises an arm portion extending from the axis shaft radially beyond the first portion.

12. The rotary actuator of claim 9, wherein the axis shaft is fixedly positioned relative to a second axis shaft by the first housing and the second housing.

13. The articulated joint of claim 1, wherein:
the first rotary actuator further comprises a first gear section having first gear teeth; and
the second rotary actuator further comprises a second gear section having second gear teeth configured to intermesh with the first gear teeth and coordinate reciprocal movement of the first piston with reciprocal movement of the second piston.

14. The rotary actuator of claim 1, wherein at least one of the first housing and the second housing is formed from a single piece of material as a unitary, one-piece housing.

15. The rotary actuator of claim 1, wherein a unitary housing comprises the first housing and the second housing, the unitary housing formed from a single piece of material as a unitary, one-piece housing.

16. The rotary actuator of claim 1, wherein at least one of the first piston and the second piston has one of a square, rectangular, ovoid, elliptical, or circular shape in cross-section.

17. The rotary actuator of claim 1, further comprising:
a first position module configured to determine a first rotational position of the first piston;
a second position module configured to determine a second rotational position of the second piston;
a control module configured to control fluid pressures in the first pressure chamber and the second pressure chamber based on the first positon and the second position, and coordinate reciprocal movement of the first piston with reciprocal movement of the second piston.

18. A method of rotary actuation comprising:
providing an articulated joint comprising:
a first rotary actuator comprising:
a first housing defining a first arcuate chamber comprising a first cavity and a first open end; and
an arcuate-shaped first piston having a first radius of curvature and disposed in said first housing for reciprocal movement in the first arcuate chamber through the first open end and in a first plane about a first axis, wherein a first seal, the first cavity, and the first piston define a first pressure chamber;
a second rotary actuator comprising:
a second housing defining a second arcuate chamber comprising a second cavity and a second open end; and
an arcuate-shaped second piston having a second radius of curvature and disposed in said second housing for reciprocal movement in the second arcuate chamber through the second open end and in a second plane substantially parallel to the first plane about a second axis, wherein a second seal, the second cavity, and the second piston define a second pressure chamber;
wherein a first radial side of the first piston relative to the first radius of curvature is in bearing contact with a first radial side of the second piston relative to the second radius of curvature at a contact point between the first axis and the second axis;
applying pressurized fluid to the first pressure chamber;
applying pressurized fluid to the second pressure chamber;
urging the first piston partially outward from the first pressure chamber in a first rotational direction;
urging the second piston partially outward from the second pressure chamber in a second rotational direction opposite the first rotational direction; and
bearing the first piston against the second piston.

19. The method of claim 18, wherein bearing the first piston against the second piston further comprises contacting a first radial side of the first piston relative to the first radius of curvature to a first radial side of the second piston relative to the second radius of curvature at a contact point between the first axis and the second axis.

20. The method of claim 18, wherein the articulated joint further comprises a bearing member; and wherein bearing the first piston against the second piston further comprises:
contacting the bearing member to the first radial side of the first piston; and
contacting the bearing member to the first radial side of the second piston, such that the first radial side of the second piston is in indirect contact with the first radial side of the first piston through the bearing member.

21. The method of claim 18, wherein:
urging the first piston partially outward from the first pressure chamber in the first rotational direction further comprises urging, by a first radial force having a first magnitude in a first radial direction, the first piston radially outward; and
urging the second piston partially outward from the second pressure chamber in the second rotational direction further comprises urging, by a second radial force having a second magnitude substantially equal to the first magnitude and a second radial direction substantially opposite the first radial direction, the second piston radially outward; and
wherein bearing the first piston against the second piston further comprises:
applying, by the first piston, the first radial force to the first radial side of the second piston; and,
applying, by the second piston, the second radial force to the first radial side of the first piston.

22. The method of claim 18, wherein the first radial side of the first piston is a radially outer side of the first piston, and the first radial side of the second piston is a radially outer side of the second piston.

23. The method of claim 18, further comprising affixing the first housing to the second housing.

24. The method of claim 18 further comprising rotating a rotary output shaft extending from a selected one of a first axis shaft of the first rotary actuator and a second axis shaft of the second rotary actuator.

25. The method of claim 18 further comprising actuating an arm portion extending from the first axis shaft.

26. The method of claim 18, wherein the first rotary actuator further comprises a first gear section having first gear teeth, and the second rotary actuator further comprises a second gear section having second gear teeth; and wherein the method further comprises:
intermeshing the first gear teeth with the second gear teeth;
urging, by movement of the first piston, movement of the first gear section relative to the second gear section; and
urging, by the relative movement of the first gear section relative to the second gear section, coordinated reciprocal movement of the second piston with reciprocal movement of the first piston.

27. The method of claim 18, further comprising:
determining a first rotational position signal representative of the reciprocal movement of the first piston;
determining a second rotational position signal representative of the reciprocal movement of the second piston;
controlling a first fluid pressure in the first pressure chamber and a second fluid pressure in the second pressure chamber based on the first positon and the second position; and
coordinating reciprocal movement of the first piston with reciprocal movement of the second piston based on the first fluid pressure and the second fluid pressure.

* * * * *

UNITED STATES PATENT AND TRADEMARK OFFICE
CERTIFICATE OF CORRECTION

Page 1 of 1

PATENT NO. : 10,935,054 B2
APPLICATION NO. : 16/575089
DATED : March 2, 2021
INVENTOR(S) : Kamran Eftekhari Shahroudi, Barry T. Brinks and Brian Hoemke It is certified that error appears in the above-identified patent and that said Letters Patent is hereby corrected as shown below:

On the Title Page

In Page 2, Column 2, Other Publications, Line 1, please delete "Preminmy" and insert
-- Preliminary --

In the Specification

In Column 2, Line 46, please delete "positon" and insert -- position --

In Column 3, Line 66, please delete "positon" and insert -- position --

In Column 4, Line 65, please delete "acutator." and insert -- actuator. --

In Column 9, Line 49, please delete "422." and insert -- 422, --

In Column 23, Line 12, please delete "positon" and insert -- position --

In Column 24, Line 52, please delete "29A-31A." and insert -- 29A-31A, --

In Column 28, Line 65, please delete "positon" and insert -- position --

In the Claims

In Column 30, Line 46, Claim 17, please delete "positon" and insert -- position --

In Column 32, Line 41, Claim 27, please delete "positon" and insert -- position --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*